US012445815B1

(12) United States Patent
Elalfy et al.

(10) Patent No.: US 12,445,815 B1
(45) Date of Patent: Oct. 14, 2025

(54) SYSTEM AND METHOD FOR DETECTING AND COUNTING ROAD ANOMALIES

(71) Applicant: King Fahd University of Petroleum and Minerals, Dhahran (SA)

(72) Inventors: Yasser Elsayed Mohamed Elalfy, Dhahran (SA); Uthman Baroudi, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 19/246,174

(22) Filed: Jun. 23, 2025

(51) Int. Cl.
*G06V 20/56* (2022.01)
*G06V 10/40* (2022.01)
*G06V 10/764* (2022.01)
*H04W 4/40* (2018.01)

(52) U.S. Cl.
CPC ............. *H04W 4/40* (2018.02); *G06V 10/40* (2022.01); *G06V 10/764* (2022.01); *G06V 20/588* (2022.01)

(58) Field of Classification Search
CPC ....... G01N 2021/1765; G06K 9/00664; G06K 9/00805; G06K 9/2018; G06T 2207/10048; H04W 4/40; G06V 10/40; G06V 10/764; G06V 20/588
See application file for complete search history.

(56) References Cited

U.S. PATENT DOCUMENTS

| | | | |
|---|---|---|---|
| 11,734,910 B2 | 8/2023 | Mithun et al. | |
| 2018/0068495 A1* | 3/2018 | Chainer | G07C 5/008 |
| 2018/0158323 A1* | 6/2018 | Takenaka | G06V 20/46 |
| 2019/0135283 A1* | 5/2019 | Bonk | G01C 21/3822 |
| 2021/0150893 A1* | 5/2021 | Mubarek | G01C 21/3844 |
| 2023/0037798 A1* | 2/2023 | Dalmasso | G08G 1/096716 |
| 2024/0102817 A1* | 3/2024 | Bales | G01C 21/3691 |
| 2024/0140459 A1 | 5/2024 | Ropel et al. | |

FOREIGN PATENT DOCUMENTS

| | | |
|---|---|---|
| CN | 107316064 B | 7/2020 |
| CN | 119359680 A | 1/2025 |
| IN | 202521006585 A | 2/2025 |

OTHER PUBLICATIONS

Linas Kondrackis, "What is Non-Max Merging?", roboflow, Jun. 25, 2024, 13 pages.

* cited by examiner

*Primary Examiner* — Kenneth J Malkowski
(74) *Attorney, Agent, or Firm* — Oblon, McClelland, Maier &Neustadt, L.L.P.

(57) ABSTRACT

A system and a non-transitory computer-readable storage medium for executing a method of detecting road anomalies includes obtaining visual data of a road from an end computing device and inputting the visual data to a machine learning (ML) model that learns to detect and classify at least one road anomaly such as a pothole, longitudinal crack, transverse crack, or alligator crack. The class and a bounding box of at least one road anomaly are output. Multiple post-detection features of the road anomaly, such as an object box area, intersection of neighboring object boxes, union of neighboring object boxes are determined. When the road anomaly is detected across multiple sequential frames, a number of skip frames is determined based on a model fidelity distance (MFD) and a vehicle speed.

20 Claims, 11 Drawing Sheets

SYSTEM AND METHOD FOR DETECTING AND COUNTING ROAD ANOMALIES

BACKGROUND

Technical Field

The present disclosure is directed to detecting and counting road anomalies such as potholes and cracks, and more particularly relates, to a system and a method to detect large road anomalies and counting anomalies especially in cases in which bounding boxes partially or fully overlap.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Road users, including automobiles, bikes, and cyclists, consistently demand timely and proper maintenance of thoroughfares. Weather conditions, such as heat and cold, create an environment that accelerates the steady deterioration of roads. Besides weather, factors like high traffic volumes, population density, and vehicle types (e.g., heavy traveling vehicles (HTV) or light traveling vehicles (LTV) also contribute to road damage, leading to faults like cracks and potholes. As public concern over road conditions grows, it becomes increasingly important to monitor and maintain road surfaces efficiently and cost-effectively. Road accidents are closely linked to road conditions, with potholes, cracks, and bumps significantly affecting driving behavior and potentially causing dangerous situations. Road inspection typically involves various cost-intensive methods, including dedicated vehicles and manual human inspections (manual process), which are time-consuming and labor-intensive. Inspectors traverse multiple roads, assessing the severity of deterioration and prioritizing repairs accordingly. The manual process is slow and requires considerable human effort.

There are existing automated methods or systems to tackle the laborious procedure of detecting cracks or potholes, such as using a vehicle or UAV for inspection. For example, a conventional supervised AI system predicts the presence and location of anomalies based on pixel-level anomaly scores, using only image-level labels. The AI system employs a deep learning model that generates an anomaly score map, highlighting differences between normal and anomalous regions. This approach significantly reduces annotation time and cost. The AI system outputs precise anomaly locations and enables real-time detection even at high speeds with high accuracy and low false positives. However, it may struggle with subtle anomalies or under extreme conditions, and performance associated with the conventional AI system depends heavily on the quality and representativeness of the training data.

The Road Damage Dataset (RDD2022) contains 47,420 annotated road images from six countries, with over 55,000 instances of road damage. It includes four types of damage: longitudinal cracks, transverse cracks, alligator cracks, and potholes, enabling diverse training scenarios. The dataset supports the development of deep learning models for automated, low-cost road condition monitoring across vast regions. The dataset is used to benchmark algorithms for object detection and classification on a standardized, international dataset. However, variations in road conditions, lighting, and camera setups across the six countries may pose challenges for model generalization.

The Crowdsensing-based Road Damage Detection Challenge (CRDDC) 2022 featured multiple phases, but a limited time impacted model training and experimentation. The CRDDC introduced high-resolution, diverse data and encouraged global participation, advancing road damage detection research. However, high computational requirements limited accessibility for participants with fewer resources. Future challenges could benefit from more allocated time, graphics processing support, and the inclusion of new tasks such as severity analysis. Additionally, incorporating multiple evaluation metrics would help assess model performance more comprehensively.

Automated pothole-detection technologies aim to reduce manual labor and improve efficiency in road maintenance, making significant contributions to intelligent transportation systems. They integrate deep learning, machine learning, and signal processing to achieve accurate and scalable detection through various methods: vision-based, vibration-based, and 3D reconstruction. These methods support real-time applications, preventive maintenance, and enhanced performance in autonomous driving and vehicle suspension systems. However, high computational demands and a need for standardized accuracy evaluation metrics (e.g., IoU, mAP) pose challenges for real-world deployment. Additionally, edge device implementation and real-time processing require further development to ensure robust, on-the-go detection in diverse environments.

Deep Convolutional Neural Networks (DCNNs) have become essential in road pothole detection by learning hierarchical features from images for improved accuracy. Unlike classical methods, DCNNs can handle complex patterns and irregular shapes without explicit programming. They enable tasks like image classification and object detection, but combining 3-D reconstruction with semantic segmentation offers deeper insights into pothole geometry. However, DCNNs require large, well-annotated datasets and significant computational power, which can be challenging to obtain and manage. Efforts like self-supervised learning and model optimization aim to reduce these limitations and improve real-world applicability.

Further, an edge-based technique for anomaly detection and classification using vision-based methods to provide instant vehicle warnings, leveraging edge computing capabilities. An end node that represents a surveillance vehicle is configured to scan the road surface, collect visual data using a camera and process the visual data to detect road anomalies such as potholes and cracks. The surveillance vehicle then classifies each type of road anomaly based on its features. The surveillance vehicle is also configured to classify anomalies into multiple (e.g., four) categories, such as potholes, longitudinal cracks, transverse cracks, and alligator cracks.

A conventional anomaly counting system incorrectly counts anomalies under specific road conditions, such as old roads with successive and long anomalies. Additionally, large anomalies detected multiple times in sequential frames and overlapping bounding boxes caused issues like partial overlaps and cases where one bounding box completely engulfs another.

Each of the aforementioned references suffers from one or more drawbacks hindering their adoption. Each of the aforementioned references focused on automated road anomaly detection, but they lack accuracy, anomaly counting and assessment. An object of the present disclosure is a system or method capable of efficiently identifying and counting one or more road anomalies, particularly large anomalies relative to a fidelity of a machine learning model, as well as cases where there are overlapping detection bounding boxes of different anamoly classes or for the same anamoly class.

SUMMARY

In an exemplary embodiment, a method of detecting road anomalies is described. The method includes obtaining visual data of a road from an end computing device in a vehicle travelling along the road. The visual data is a live feed captured using a camera mounted in the vehicle and sent to the end computing device. The method includes inputting the visual data to a machine learning (ML) model in the end computing device that learns to detect and classify at least one road anomaly. The class of the road anomaly includes one of a pothole, longitudinal crack, transverse crack, or alligator crack on the road. The method includes outputting the class and bounding box, created by the ML model, of the at least one road anomaly and determining multiple post-detection features of the detected at least one road anomaly. The determining multiple post-detection features includes determining that the at least one road anomaly is detected across multiple sequential frames and when the at least one road anomaly is detected across multiple sequential frames, determine a number of skip frames based on a model fidelity distance (MFD) and a vehicle speed in meters per frame, wherein the MFD is a distance that the ML model can detect objects within a predetermined error. The method includes determining that the detected at least one road anomaly is detected multiple times in each of the multiple sequential frames and skipping frames based on the number of skip frames to a key frame. The method includes transmitting, via a roadside computing device installed proximate to the road, a notification to multiple end computing devices in a communication range of the roadside computing device. The notification is an anomaly-specific notification that includes at least one of a message indicating a presence of the road anomaly, an image of the road anomaly, a location of the road anomaly, or a severity of the road anomaly.

In another exemplary embodiment, a system comprises at least one camera, mounted in a vehicle, configured to capture a live feed and an end computing device, in the vehicle travelling along a road, configured to send visual data. The visual data is the live feed captured using the camera. A processing circuitry is configured to input the visual data to a machine learning (ML) model that learns to detect and classify at least one road anomaly. The class of the road anomaly includes one of a pothole, longitudinal crack, transverse crack, or alligator crack on the road. The processing circuitry is configured to output the class and bounding box, created by the ML model, of the at least one road anomaly and determine multiple post-detection features of the detected at least one road anomaly. The determined multiple post-detection features include that the at least one road anomaly is detected across multiple sequential frames. When the at least one road anomaly is detected across multiple sequential frames, the processing circuitry is configured to determine a number of skip frames based on a model fidelity distance (MFD) and a vehicle speed in meters per frame. The MFD is a distance that the ML model can detect objects within a predetermined error. The processing circuitry is configured to determine that the detected at least one road anomaly is detected multiple times in each of the multiple sequential frames, skip frames based on the number of skip frames to a key frame. A roadside computing device installed proximate to the road is configured to transmit a notification to multiple end computing devices in a communication range of the roadside computing device. The notification is an anomaly-specific notification that includes at least one of a message indicating a presence of the road anomaly, an image of the road anomaly, a location of the road anomaly, or a severity of the road anomaly.

In another exemplary embodiment, a non-transitory computer readable medium having instructions stored therein that, when executed by one or more processor, cause the one or more processors to perform a method of detecting road anomalies is described. The method includes obtaining visual data of a road from an end computing device in a vehicle travelling along a road. The visual data is a live feed captured using a camera mounted in the vehicle and sent to the end computing device. The method includes inputting the visual data to a machine learning (ML) model in the end computing device that learns to detect and classify at least one road anomaly. The class of the road anomaly includes one of a pothole, longitudinal crack, transverse crack, or alligator crack on the road. The method includes outputting the class and a bounding box, created by the ML model, of the at least one road anomaly and determining multiple post-detection features of the detected at least one road anomaly. The determining multiple post-detection features includes determining that the at least one road anomaly is detected across multiple sequential frames and when the at least one road anomaly is detected across multiple sequential frames, determine a number of skip frames based on a model fidelity distance (MFD) and a vehicle speed in meters per frame, wherein the MFD is a distance that the ML model can detect objects within a predetermined error. The method includes determining that the detected at least one road anomaly is detected multiple times in each of the multiple sequential frames and skipping frames based on the number of skip frames to a key frame. The method includes transmitting, via a roadside computing device installed proximate to the road, a notification to multiple end computing devices in a communication range of the roadside computing device. The notification is an anomaly-specific notification that includes at least one of a message indicating a presence of the road anomaly, an image of the road anomaly, a location of the road anomaly, or a severity of the road anomaly.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
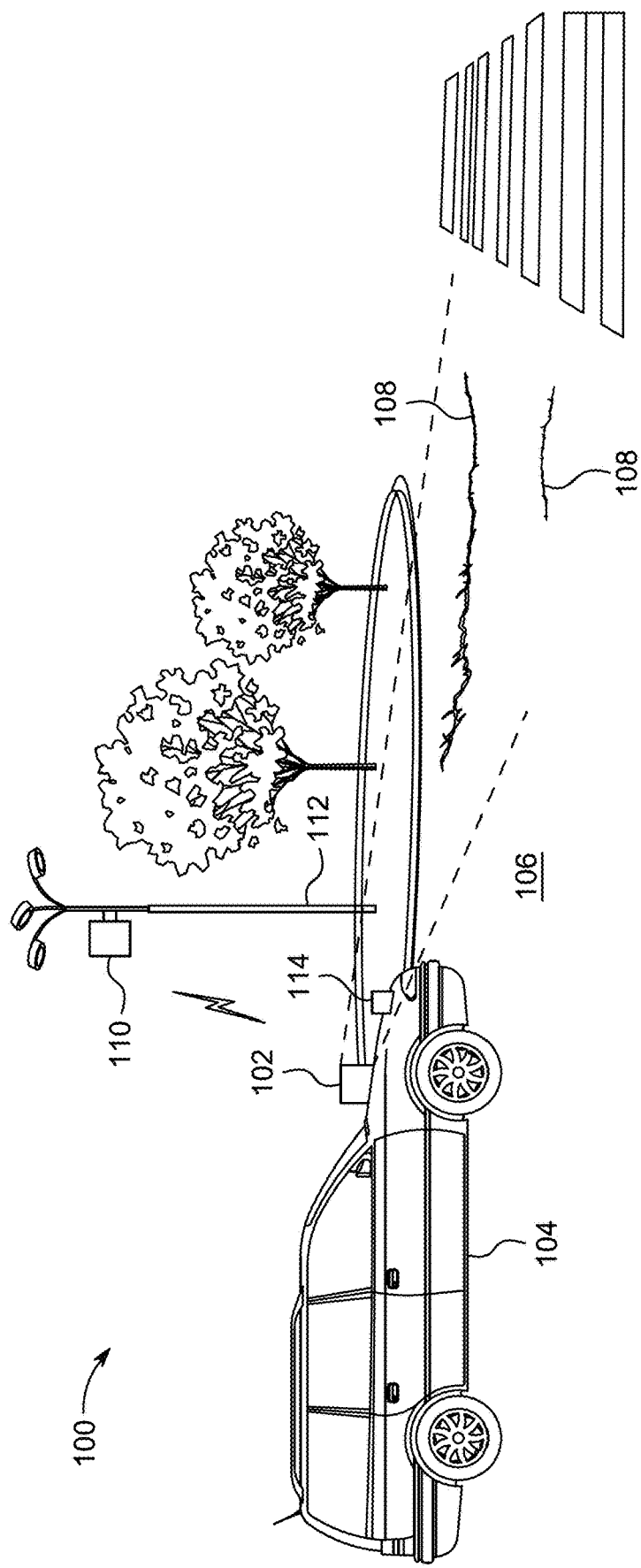
FIG. 1 is an exemplary illustration of an environment that includes one or more electronic systems to detect one or more road anomalies, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Further, the terms "anomaly" and "road anomaly" represent same terms and used throughout the disclosure synonymously.

Further, the terms "end computing device" and "first electronic system" represent same terms and used throughout the disclosure synonymously.

Further, the terms "roadside unit", "roadside computing device", "second computing device" and "second electronic system" represent same terms and used throughout the disclosure synonymously.

Further, the terms "first end computing device" and "other end computing device" represent same terms and used throughout the disclosure synonymously.

Further, the terms "processor" and "processing circuitry" represent same terms and used throughout the disclosure synonymously.

The present disclosure provides a system, a method and a non-transitory computer readable medium configured to implement a technique for anomaly detecting and counting road anomalies. A machine learning (ML) model in an end computing device is trained to detect and classify the road anomalies in one of a pothole, longitudinal crack, transverse crack, or alligator crack on the road. Class and bounding box of the detected at least one road anomaly are output. Multiple features of the detected at least one road anomaly include an object box area, intersection of neighboring object boxes, and union of neighboring object boxes are determined. Further, determining whether the at least one road anomaly is detected across multiple sequential frames. When the at least one road anomaly is detected across multiple sequential frames, a skipping frame approach is performed in which a number of skip frames is calculated based on a model fidelity distance (MFD) of a machine learning model and a vehicle speed, for example in meters per frame. The skipping frame approach is such that, upon determining that the at least one road anomaly is detected multiple times in each of the multiple sequential frames, frames are skipped based on the number of skip frames to a new key frame. A count of a number of road anomalies is maintained. A roadside computing device installed proximate to the road transmits a notification of the anomaly to multiple end computing devices in the communication range of the roadside computing device. A detailed aspect of the invention is provided in depth in the following description.

FIG. 1 is an exemplary illustration of an environment 100 that includes one or more electronic systems to detect one or more road anomalies, according to certain embodiments. The environment comprises a road 106 on which the vehicle travels. The road 106 may be a local road, state highway, national highway, or other paved road. The road 106 may have one or more anomalies that are captured by the one or more electronic vision systems. The electronic vision system may include at least one camera 114 (hereinafter referred to as the camera 114). In one aspect, the at least one camera 114 is mounted in the vehicle 104, which captures images or video of the road the vehicle travels. The image or the video capture may be a live feed or recorded in a storage system for processing by an end computing device 102. In another aspect, one or more cameras may be mounted on the vehicle 104. In an example, the camera 114 mounted in the vehicle may be a dashcam. The camera 114 may be selected from a group containing, but is not limited to, an infrared camera, a red-green-blue (RGB) camera, a stereo camera, a 2-dimensional (2D) camera, a 3-dimensional (3D) camera unit, a time-of-flight (TOF) camera, line-scan camera, etc. The camera 114 may have high-definition lenses (e.g., 1080p), a wide dynamic range (WDR) (e.g., 140 degree viewing angle covering) function which may be configured to adjust according to the ambient light, built in G-sensor for image stabilization in case of shock or jerk. In some aspects, the camera 114 is a camera and processing circuitry configured to capture and detect the anomalies on the road. In an aspect, the camera 114 mounted in the vehicle 104 is communicatively coupled with the end computing device 102. The communication between the camera 114 mounted in the vehicle 104 and the end computing device 102 may be through a wired system or through a wireless system. The wireless communication between the camera 114 mounted in the vehicle 104 and the end computing device 102 may be performed through, but is not limited to, Bluetooth, wireless fidelity (Wi-Fi), and other wireless communication system.

The end computing device 102 can be installed in a vehicle 104. The end computing device 102 may be a computer, mobile device, a customized processing device for the purpose of detecting and processing anomalies, and other processing tasks. In some embodiments, the vehicle 104 may be a passenger vehicle. In embodiments, the end computing device 102 is mounted on a front or back of the vehicle.

In some exemplary implementations, the end computing device 102 may integrate the camera 114 or have an additional image-capturing device (not shown) and associated image processing circuitry electrically connected to the image capturing device. The end computing device 102 may be placed in a secure enclosure. In an embodiment, the end computing device 102 is mounted inside the vehicle 104 to protect the end computing device 102 from rain, dust, adverse environment, etc. Furthermore, the end computing device 102 can be configured with a battery, cell, or solar panel-based power supply to power to all electrical components of the end computing device 102.

Also, the vehicle 104 is only exemplary illustrated as a car over which the end computing device 102 is mounted. However, the vehicle 104 may be selected from the group containing, but not limited to, any utility vehicle deployed by municipal committees or commercial vehicles such as trucks, buses, or even bikes. Also, the vehicle 104 may be an autonomous vehicle (e.g., driverless vehicle), remote controlled vehicle or a human-operated vehicle. In another exemplary embodiment, the vehicle 104 may even refer to a flying based object, such as quadrotor, quadcopter, drone, unmanned aerial vehicle (UAV), automatic flying vehicle, automated aircraft, multicopter or the like, over which the end computing device 102 may be mounted to capture visual data of the road 106 for inspection. In an embodiment, the end computing device 102 includes raspberry pi 4 based computing system having 8 GB processor.

The environment 100 also includes a roadside computing device 110 installed proximate to a road 106, such as on a pole 112. The roadside computing device 110 is communicatively connected with the end computing device 102. The roadside computing device 110 as well as the end computing device 102 include wireless communication modules to transmit or receive the visual data of the road 106 between each other. In an embodiment, the wireless communication between the roadside computing device 110 and the end computing device 102 could be performed using, but not limited to, infrared, Bluetooth, NFC, Wi-Fi, Li-Fi, 1G, 2G, 3G, 4G, 5G, 6G, or advanced generations-based GSM communication techniques, radio communication, IoT, V2X or alike.

In an embodiment, the camera 114 is configured to send the captured visual data (i.e., live feed) to the roadside computing device 110.

In another embodiment, the end computing device 102 in the vehicle is configured to send the visual data (i.e., live feed captured using the camera 114 mounted in the vehicle 104) to the roadside computing device 110. The roadside computing device 110 is an electronic system configured to collect visual data from the end computing device 102. The roadside computing device 110 is configured to transmit a notification to multiple (one or more) end computing devices in a communication range of the roadside computing device. The notification is used to alert other nearby end computing devices 102 in proximity to the roadside computing device 110 when a potential road anomaly 108 is detected. The roadside computing device 110 refers to an electronic system having capability to perform complex computation, such as a laptop, desktop, a cloud-based system, a central server, a mobile device or a custom computing device for purpose of detecting and communicating anomalies, or the like.

Figure 2:
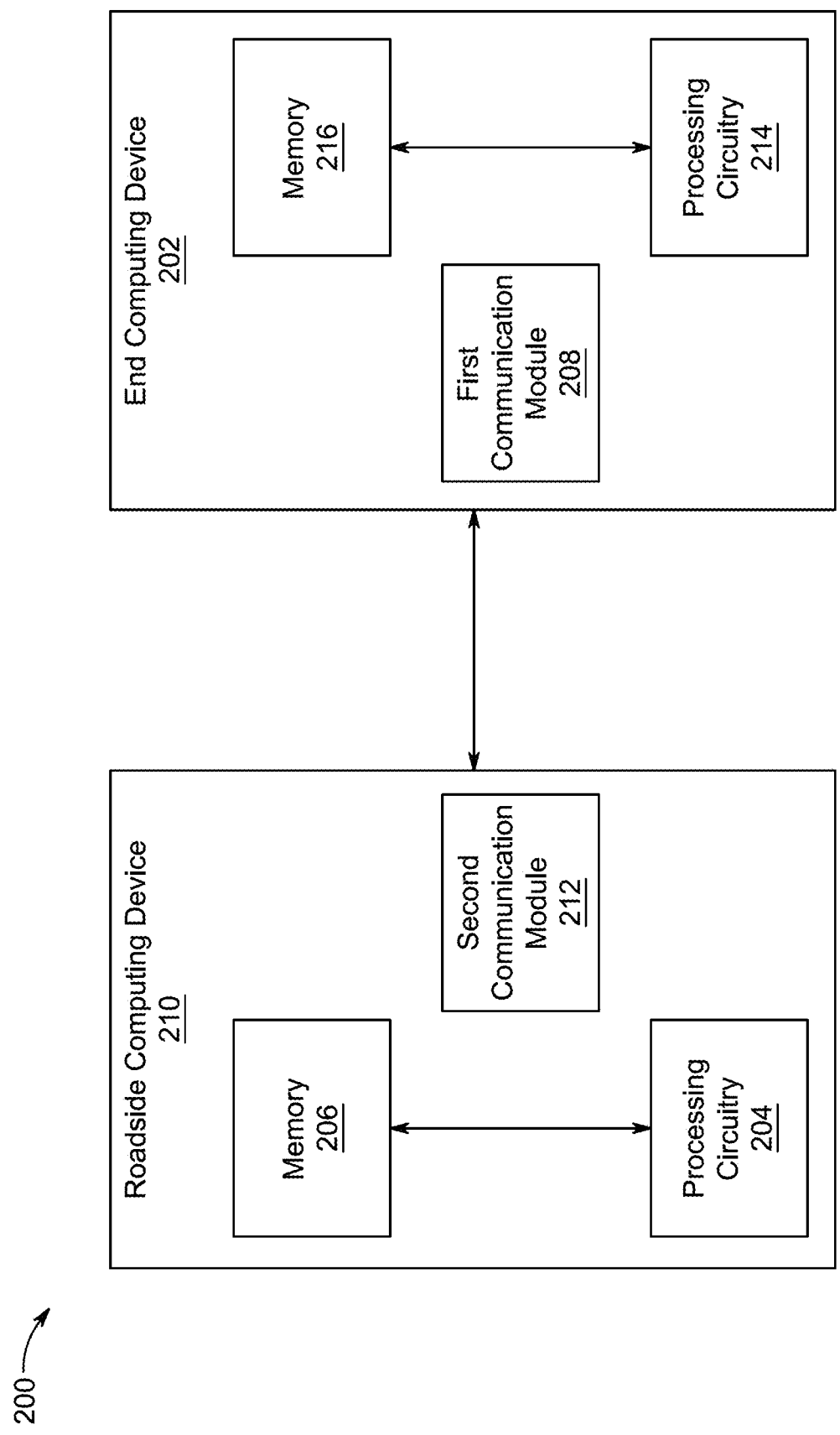
FIG. 2 illustrates a general block diagram of a system for identifying one or more road anomalies, according to certain embodiments.

FIG. 2 illustrates a general block diagram of a system 200 for identifying one or more road anomalies, according to certain embodiments.

The system 200 includes a first electronics system 202 that is representative of the end computing device 102 in FIG. 1. The system 200 further includes a second electronic system 210 that is representative of the roadside computing device 110 in FIG. 1. The first electronics system 202 includes a processing circuitry 214 and a memory 216 connected with the processing circuitry 214. The second electronics system 210 also includes a processing circuitry 204 and a memory 206 connected with the processing circuitry 204. Other hardware as required may be connected in both systems as per the computing requirements, either individually or in combination. For example, the first electronics system 202 may additionally include a GPS system or use the GPS system of the vehicle 104 over which the first electronics system 202 obtains location information. In an exemplary embodiment, the first electronics system 202 may use the GPS system of smartphones of the occupants travelling by the vehicle 104 which connect to the first electronics system 202 either wirelessly by Bluetooth or by a wired connection via USB port.

The first electronic system 202 and the second electronic system 210 are communicably connected with each other via a first communication module 208 in the first electronic system 202 and a second communication module 212 in the second electronic system 210. In order to identify one or more anomalies 108 on the road, the first electronic system 202 or the second electronic system 210 is configured to execute an object detection method in the processing circuitry 214 or 204, respectively.

The roadside computing device 110, 210 wirelessly communicates with an end computing device 102, 202 to start collecting the visual data. The roadside computing device 110, 210 commands the end computing device 102, 202 to start collecting the visual data. In some embodiments, the end computing device 102, 202 may start collecting the visual data (a) regardless of whether a command is received from the roadside computing device, (b) upon receiving a command from a user, or (c) when the end computing device 202 is powered on. The processing circuitry 214 within the end computing device 102, 202 initiates the camera associated with the end computing device 102, 202 to start collecting the visual data when the vehicle 104 is traveling on the road 106.

In an embodiment, the visual data is a live feed, a live stream video of the road 106 or recorded data. In an embodiment, the roadside computing device 110, 210 may also set a minimum threshold speed of the vehicle 104, such as 20 kmph or 30 kmph, which when achieved by the vehicle 104, would automatically trigger the end computing device 102, 202 to start collecting the visual data. In another embodiment, the visual data may be collected independently of the speed of the vehicle 104 and depends on the user initiating to start collecting the visual data using one or more buttons available on a graphical user interface of the end computing device 102, 202.

Furthermore, the visual data is simultaneously captured and transmitted to the processing circuitry 214 of the end computing device 102, 202. A memory 216 and/or the processing circuitry 214 of the end computing device 102, 202 stores and runs a machine learning (ML) model, such as a deep learning model that learns to and performs inference detect and classify a road anomaly 108 in the visual data.

In an embodiment, the ML model is implemented at the end computing device 102, 202. The processing circuitry 214 of the end computing device 102, 202 is configured to input the visual data to the ML model to detect and classify the road anomaly. The end computing device 102, 202 can also be configured to stream portions of the visual data containing the detected road anomaly to the roadside computing device 110, 210.

The road anomaly 108 includes, but is not limited to, a pothole, longitudinal cracks, transverse cracks, or alligator cracks on the road 106. In an aspect, the pothole is a depression in a road surface that results from gradual damage caused by traffic, water infiltration, freeze-thaw cycles, traffic stress, material fatigue and weather conditions. The pothole may be of a size ranging from a few centimeters to over a meter in diameter. Depth of the pothole may vary from shallow depressions to deep holes (often, depths greater than 2 cm are considered problematic). The edges are typically irregular or jagged, depending on the stage of degradation. The potholes often appear darker or rougher than the surrounding pavement in terms of color and texture.

In an aspect, the longitudinal cracks are a type of road anomaly characterized by linear fractures that run parallel to the direction of traffic flow, often forming in wheel paths, near lane joints, or along the center of lanes. These cracks deviate from the intended smooth pavement surface and typically indicate underlying structural issues or material fatigue. The longitudinal cracks are usually straight or gently curved and may appear as isolated cracks or in a series. The width of longitudinal cracks begins as hairline fractures (less than 1 mm) and can widen over time, while their length may extend for several meters, depending on severity. Edges may be clean or slightly raveled, particularly in older pavement, and the cracks often appear darker or rougher than the surrounding surface due to moisture or debris accumulation. In an aspect, the transverse cracks are a type of road surface anomaly characterized by cracks that run perpendicular or nearly perpendicular to the direction of traffic flow, resulting from thermal stress, pavement aging, or structural movement.

Transverse cracks appear evenly spaced across lanes, particularly in asphalt pavements, and may be straight or slightly curved depending on surface stress. Transverse cracks occur as isolated instances or in repeating patterns. The width of transverse cracks usually begins as narrow hairline fractures and may widen to several millimeters over time, spanning the full width of a lane or roadway. The edges of these cracks may initially be clean but become raveled or spalled as the pavement deteriorates. The transverse cracks appear darker than the surrounding pavement when filled with moisture or debris and are important indicators of pavement distress that can affect both structural integrity and ride quality.

In an aspect, alligator cracks, also known as fatigue cracks, are a type of road surface anomaly marked by a network of interconnected cracks that resemble the pattern of an alligator's skin. This cracking pattern is a clear indicator of structural failure in the pavement, occurring in the surface or base layers, and is often caused by repeated traffic loading from heavy vehicles. These cracks form a dense, blocky or cellular pattern, with small, irregular-shaped segments typically measuring between 30 to 60 cm across, and tend to cluster in concentrated areas, in wheel paths or other structurally weak spots. Alligator cracking usually begins as fine longitudinal cracks, which then spread and interconnect over time to form more complex patterns. In advanced stages, the cracked segments may become loose or break away, leading to pothole formation. Visually, affected areas often appear darker due to trapped moisture or debris, and the surface becomes rough and uneven, significantly reducing ride quality and indicating the need for substantial repair or full-depth reconstruction. Further, the road anomaly may include, but is not limited to, rumps, speed bump deterioration, road debris and oil spots, to name a few.

The processing circuitry 214 of the end computing device 102, 202 fetches the machine learning model from the memory 216 and executes inferencing by the ML model to detect the presence of any road anomaly (e.g., pothole, longitudinal cracks, transverse cracks, or alligator cracks) in the image. Upon detecting the presence of the road anomaly, the ML model determines a class and a bounding box of the road anomaly.

To determine the class of the road anomaly, the ML model processes the image and extracts features such as edges, textures, patterns, shapes, curvatures, shadows. The ML model then infers an anomaly from the extracted features. The ML model can be trained with a database (e.g., RDD2022 dataset, training data) comprising road anomaly data. The ML model may also determine the class of the road anomaly by initially predicting several possible classes. A final layer of the ML model may determine the likely class from among the possible classes. In an example, a road image contains a large, circular depression with a dark color and jagged edges. The ML model extracts features from the image, such as edges—sharp edges around a circle; texture—rough inside and smooth outside; and pattern—a concave depression with a dark center. These extracted features can include characteristics of potholes, such as round shape, jagged edges, and dark centers, as well as crack features like thin lines, high edge contrast, and narrow shapes. The ML model then determines that the extracted features identify the road anomaly as a "pothole."

In another example, a road image shows a long, thin, dark line. The ML model extracts features such as edges, for example, thin and high contrast, texture, for example, discontinuous; and pattern, for example, linear, possibly branching. The model then determines that the road anomaly is a "crack" based on the extracted features.

The ML model is trained to apply a bounding box containing the identified anomaly 108 in the visual data by estimating the size of anomaly 108 based on its dimensions. The bounding box encloses a portion of a frame of the visual data having the road anomaly 108. In other words, the ML model generates the bounding box containing the anomaly 108 in the visual data.

The ML model is a neural network for object detection. In a preferred embodiment, the ML model is a convolutional neural network, such as a version of YOLO (You Only Look Once). YOLO models are single stage object detectors. In a YOLO model, image frames are featurized through a backbone. These features are combined and mixed in a neck, and then they are passed along to the head of the network. YOLO predicts the locations and classes of objects around which bounding boxes are drawn.

Although a version of YOLO model has been used, the present disclosure is not limited to this model. Other convolutional neural network-based deep learning models for object detection include Single Shot Detector (SSD), Faster R-CNN, and RetinaNet.

In an embodiment, the ML model (e.g., YOLO object detection model) processes the image and divides it into a grid (e.g., 13*13 or 19*19). For each grid cell, the ML model predicts bounding box coordinates, object scores, class probabilities, etc. For example, upon detecting the class=pothole, the object score=0.92 and the bounding box= [150, 320, 280, 450]. The bounding box from pixel (150, 320) to (280, 450) outlines the pothole. In another example, upon detecting the class=crack, the object score=0.85 and the bounding box=[400, 300, 450, 380]. The bounding box from pixel (400, 300) to (450, 380) outlines the crack. In this way, the ML model outputs the class and bounding box of the at least one road anomaly.

Further, a count of a number of road anomalies is maintained. If, for example, a pothole is detected, the ML model classifies the anomaly 108 as the pothole type and increments a counter for the pothole. Similarly, if, for example, a longitudinal crack is detected, the ML model classifies the anomaly 108 as the longitudinal crack and increases a counter associated with the longitudinal crack. Similarly, if the ML model classifies the anomaly 108 as transverse cracks or alligator cracks and increases the counter for transverse cracks and the counter for alligator cracks, respectively, when the visual data indicates a presence of transverse cracks or alligator cracks, respectively.

After the ML model performs object detection, multiple post-detection features of the detected road anomaly are determined. Once, the ML model identifies the presence of one or more anomaly 108, the ML model automatically tags the image or footage having anomaly 108 with the GPS location of the vehicle and proceeds to identify one or more features of the detected anomaly 108.

In an aspect, to determine multiple post-detection features, the processing circuitry 214 of the end computing device 102, 202 determines that the at least one road anomaly is detected across multiple sequential frames.

In an embodiment, the video comprises a series of frames produced at a consistent frame rate (i.e., frames per second (FPS)). Each frame is a snapshot/image of the captured video at a particular moment in time.

When the at least one road anomaly is detected across multiple sequential frames, a skipping frame approach is applied. In an embodiment, the number of skip frames is determined based on a model fidelity distance (MFD) and a vehicle speed, for example in meters per frame. The approach moves to a key frame, i.e., skips frames, which is a new frame that moves to a new scene. The key frame is dependent on the speed of the vehicle. Further, the key frame is also dependent on the distance within which the ML model (e.g., artificial intelligence (AI) detection model) performs effectively. The distance is referred to as MFD. The MFD refers to a range or distance within which the ML model (or AI model) maintains high accuracy and reliable performance. The MFD is a distance that the ML model can detect objects within a predetermined error.

In road anomaly detection, the MFD defines the spatial limit where the ML model accurately detects, classifies, or localizes objects or features without significant loss in fidelity or precision. The Model Fidelity Distance (MFD) may be estimated empirically. Estimation of the MFD empirically can be carried out, for example, by collecting a set of test images of road anomalies at known distances from the end computing device (as shown in Table 1). The ML model is run on the test images. A performance threshold is set $>=0.8$. Identify the farthest distance bin where the ML model meets or exceeds the threshold.

TABLE 1

Samples collected for a distance range

| Distance Range (meters) | Number of Samples | Score |
|---|---|---|
| 0-5 | 50 | 0.92 |
| 5-10 | 60 | 0.86 |
| 10-15 | 40 | 0.77 |
| 15-20 | 30 | 0.63 |

The ML model performs well above the threshold ($\geq 0.80$) for distances 0-10 meters. Here, the MFD=10 meters, as it is the farthest distance where the model meets the performance requirement.

Further, the processing circuitry 214 of the end computing device 102, 202 determines that the detected at least one road anomaly is detected multiple times in each of the multiple sequential frames. In an aspect, frames are skipped based on the calculated number of skip frames to the key frame.

For example, the processing circuitry 214 calculates the number of skip frames (SF) as shown in Equation 1, $$\text{Skip Frames}(SF) = MFD(\text{meters})/\text{speed}(\text{meters per frame}). \quad (1)$$

Speed (meters per frame) is calculated as shown in Equation 2.

$$\text{Speed} = \text{Speed}(\text{meters per second})/\text{Camera speed (frames per second)} \quad (2)$$

For example, a vehicle is moving at 10 meters per second. The camera mounted in the vehicle captures road images at 5 frames per second. Speed=10 (meters per second)/5 (frames per second)=2 meters per frame. Further, the MFD=10 meters and the speed=2 meters per frame. So, the skip frames (SF)=10 meters/2 meters per frame=5 frames. The skip frames=5 frames indicate that 5 frames are skipped between analyzed frames to ensure the camera moves at least 10 meters between analyzed frames.

Experiment 1 is performed to compare the results of anomaly detection of the conventional technique, i.e., frame span interval (FSI) technique and the present approach, i.e., frame skipping technique. The results of the experiment 1 are presented in Table 2 as shown below. Table 2 shows the comparison of the present disclosure (frame skipping) and the baseline method as described in our earlier disclosure (frame span interval (FSI)).

TABLE 2

| Video Name | Actual Potholes/cracks Count | FSI | Repeated/ missing anomalies | Frame skipping technique | Repeated anomalies |
|---|---|---|---|---|---|
| Video 1- 70 kmh | 164 | 496 | 332(+) | 159 | 5(−) |
| Video 2- new50 kmh | 174 | 118 | 56(−) | 159 | 15(−) |

Where, '+' and '−' indicate repeated and missing anomalies, respectively.

In an embodiment, the processing circuitry is further configured to determine further multiple post-detection features of the detected at least one road anomaly. The multiple post-detection features include an object box area, intersection of neighboring object boxes, and union of neighboring object boxes.

The post-detection features are defined using the following terms:

OBAi: Object Box Area created by the ML model/AI model

I: Intersection of neighboring object boxes.

U: Union of neighboring object boxes.

IoU: Intersection over Union (IoU).

Classi: The corresponding class for the $i^{th}$ object.

Thr: The decision threshold

In an aspect, the object box area (OBAi) refers to the size of the bounding box that encloses a detected object (i.e., road anomaly) in an image or video frame of the road. In an aspect, the intersection (I) of neighboring object boxes refers to an overlapping region shared by two or more bounding boxes that are positioned close to each other in the image. In an aspect, the union (U) of neighboring object boxes refers to the combined area that covers all the space occupied by two or more bounding boxes that are close to each other, including both overlapping and non-overlapping regions. In an aspect, the intersection over union (IoU) of neighboring object boxes refers to a metric that quantifies how much two or more nearby bounding boxes overlap relative to the total area they cover together.

Further, determining the multiple post-detection features comprises determining whether neighboring object boxes are one of fully overlapping for objects of different classes, partially overlapping for objects of different classes, fully overlapping for objects of same class, and partially overlapping for objects of same class. In an aspect, the classes of the road anomalies include, but are not limited to, one of a pothole, longitudinal crack, transverse crack, or alligator crack on the road. In an aspect, the different classes of the road anomaly refer to the distinct categories or types of road anomaly. For example, the captured image comprises the pothole and the transverse crack. So, two different road anomalies are captured in the image. The pothole is classified into the pothole class, and the transverse crack is classified into the transverse class. In an aspect, the same class of the road anomaly refers to two or more road anomalies that belong to the same predefined category or type of road anomaly. For example, the captured image comprises two potholes, which are classified into the pothole class.

Further, the fully overlapping for objects refers to a condition where one object's bounding box completely covers another object's bounding box. The partially overlapping refers to a condition where two objects' bounding boxes overlap only in some areas but not completely, i.e., two objects share some common area, but each box also covers unique areas outside the overlap.

In an embodiment, when it is determined that neighboring object boxes are fully overlapping for objects of different classes, the processing circuitry 214 is further configured to count them as two different anomalies. Upon determining that the objects are two different anomalies, the processing circuitry 214 is configured to increase the count of the corresponding classes of the anomalies.

In an embodiment, when it is determined that neighboring object boxes are fully overlapping for objects of the same class, the processing circuitry 214 is configured to count them as one anomaly. Upon determining that the objects are of the same class, the processing circuitry 214 is configured to increase the count only once for the corresponding class of the anomaly.

In an embodiment, when it is determined that the neighboring object boxes are partially overlapping, the processing circuitry 214 is configured to determine a ratio of the Intersection and the Union (IoU). The processing circuitry 214 is configured to check the IoU against a predefined threshold. If the IoU exceeds a predefined threshold, the processing circuitry 214 is configured to count the neighboring anomalies as one large, connected anomaly. Further, the processing circuitry 214 is configured to remove a smaller of the neighboring object boxes from a count of road anomalies. In aspects, the processing circuitry 214 is further configured to accumulate a count of a number of road anomalies.

In an embodiment, when it is determined that the neighboring object boxes are partially overlapping, the processing circuitry 214 is configured to apply an algorithm.

Inputs of the algorithm comprise $OBA_i$, $Class_i$, $I_s$, $U_s$, $IoU_s$; $\forall i$, Thr, and $s \in \{k\}$. Where s is a subset of overlapping k object boxes. Outputs of the algorithm comprise computation of $I_s$, Us, and IoU for each s neighboring intersecting object detected boxes. The algorithm is given below.

Input: $OBA_i$, $Class_i$, $I_s$, $U_s$, $IoU_s$; $\forall i$, Thr, $s \in \{k\}$, s is a subset of overlapping k objects'boxes
Output:
For each s neighboring intersecting object detected boxes:
Compute $I_s$, $U_s$, IoU
    "If IoU > Thr:
        Remove the small box
        elseif Is== ($OBA_i$ || $OBA_j$)
            If Classi == Classj:
                Remove the small box"

In an embodiment, the processing circuitry 214 is configured to compute $I_s$, $U_s$, and IoU for each s neighboring intersecting object detected boxes. After computation, the processing circuitry 214 is configured to determine whether IoU>Thr. If the IoU>Thr, the small box is removed. So, "IoU>Thr" indicates that the overlap between the two neighboring boxes is greater than the predefined threshold, and the two neighboring boxes may represent the same object or closely related features.

For example, an image of a road anomaly is captured. The ML model detects the road anomaly twice with slightly different bounding boxes, i.e., Box 1: [x=50, y=100, width=100, height=100] and Box 2: [x=60, y=110, width=100, height=100]. These two boxes (i.e., Box 1 and Box 2) overlap, but not completely. The processing circuitry computes the IoU between the Box 1 and the Box 2. Area of intersection (i.e., (I))=7500 $px^2$ and Area of union (i.e., (U))=13600 $px^2$. So, IoU=7500/13600≈0.6

The predefined threshold Thr=0.5. As computed IoU=0.6>0.5, consider the two neighboring boxes as likely referring to the same object.

Further, if the IoU<Thr, then the processing circuitry 214 checks whether $I_s$==($OBA_i$||$OBA_j$). $I_s$ represents the intersection of the subset of overlapping object boxes. $OBA_i$ represents object bounding area indexed by "i" and $OBA_j$ represents object bounding area indexed by "j". The processing circuitry 214 checks whether $I_s$==($OBA_i$||$OBA_j$), i.e., the intersection of the subset includes either $OBA_i$ or OBA&. Further, the processing circuitry 214 checks whether Classi==Classj, i.e., the class of object "i" equals the class of object "j". Upon determining that Classi==Classj, i.e., both the objects are considered as one anomaly, the small box is removed. If the Classi is not equal to the Classj, i.e., both the objects are considered as two different anomalies.

For example, the ML model detects the road anomaly twice with slightly different bounding boxes, i.e., Box 1: [x=50, y=100, width=100, height=100] and Box 2: [x=60, y=110, width=100, height=100]. These two boxes (i.e., Box 1 and Box 2) overlap, but not completely. The processing circuitry 214 computes the IoU between the Box 1 and the Box 2. Area of intersection (i.e., (I))=6400 $px^2$ and Area of union (i.e., (U))=13600 $px^2$. So, IoU=6400/13600≈0.47. The predefined threshold Thr=0.5. As computed IoU=0.47<0.5, the overlap is not enough to consider them the same. Then, the processing circuitry 214 checks whether $I_s$==OBA1 of Box 1 or OBA of Box 2. Further, the processing circuitry 214 checks whether the class of OBA 1 is the same as the class of OBA 2. If the class of OBA 1 is the same as the class of OBA 2, then both neighboring boxes (i.e., Box 1 and Box 2) are considered as one anomaly. For example, the classes of OBA 1 and OBA 2 are "alligator crack"; then both neighboring boxes (i.e., Box 1 and Box 2) are considered as one anomaly, i.e., alligator crack.

If the class of OBA 1 is not the same as the class of OBA 2, then both neighboring boxes (i.e., Box 1 and Box 2) are considered as two different road anomalies. For example, the classes of OBA 1 and OBA 2 are "pothole" and "alligator crack"; then both neighboring boxes (i.e., Box 1 and Box 2) are considered as two different anomalies, i.e., pothole and alligator crack.

In an embodiment, the roadside computing device 110, 210 installed proximate to the road transmits a notification to multiple end computing devices in a communication range of the roadside computing device 110, 210. The notification is an anomaly-specific notification that includes at least one of a message indicating a presence of the road anomaly, an image of the road anomaly, a location of the road anomaly, or a severity of the road anomaly. In an aspect, the presence of the road refers to the detection or existence of the road anomalies. In an aspect, the image of the road anomaly refers to a visual representation that captures the anomaly on the road. In an aspect, the location of the road anomaly refers to a precise point or area described by coordinates (e.g., latitude and longitude) on the road. In an aspect, the severity of the road anomaly refers to the level of degradation or potential risk that a specific road defect poses to vehicles or the overall integrity of the road. It indicates how critical the anomaly is in terms of requiring maintenance or posing a safety hazard.

In an embodiment, the severity of the road is assessed. The severity is determined to be of a first value when an area of the bounding box exceeds a severity threshold area. For example, the processing circuitry 214 identifies that the anomaly 108 corresponding to the first value is detected. The processing circuitry 214 identifies that the anomaly 108 corresponding to the first value matches with the specified criteria of first value-based anomaly 108. In this case, the processing circuitry 214 concludes that the notification should be broadcast to nearby other multiple end computing devices installed over the other vehicle. This means, when a highly damaged or anomaly 108 is detected, the roadside computing device 110, 210 immediately transmits the notification to other multiple end computing devices installed over the other vehicle that are currently available on the road 106 in the proximity of the roadside computing device 110 so that other vehicles that are currently traveling in time are alerted before they reach to the point of anomaly 108.

In another embodiment, the processing circuitry 214 transmits the road anomaly 108 data when severity of the first value is detected even after detecting another anomaly 108 corresponding to the severity of second value is detected. This means that a high severe anomaly 108 is detected after detecting a less severe anomaly 108. In this case, the processing circuitry 214 identifies that the anomaly 108 corresponding to the first value matches with the specified criteria of the first value-based anomaly 108 even if it is detected after detecting the second value-based anomaly 108. In this case, the roadside computing device 110, 210 concludes that the notification should be broadcast to other nearby multiple end computing devices installed on the other vehicle. This means, when a highly damaged or anomaly 108 is detected, even if the highly damaged anomaly 108 is detected after detecting a less severe anomaly 108, the roadside computing device 110, 210 immediately transmits the notification to other multiple-end computing devices installed over the other vehicle that are currently available on the road 106 in the proximity of the roadside computing device 110 so that other vehicles that are currently traveling in time are alerted before they reach to the point of anomaly 108.

In another embodiment, regardless of the severity level of the anomaly 108, the roadside computing device 110, 210 transmits the road anomaly 108 data whenever it is detected. This means, even if the second value severity of an anomaly 108 is detected and not the first value severity, the road anomaly 108 data is transmitted to other multiple end computing devices installed on the other vehicle. In both cases, the road anomaly 108 data is also transmitted to a server (e.g., cloud server) so that a road maintenance authority could analyze the condition of the road 106 and initiate the road repair maintenance in an efficient manner.

In an embodiment, the processing circuitry 214 is configured to determine a density of the road anomalies. The density of road anomalies typically refers to how many road anomalies (e.g., potholes, cracks, bumps, etc.) occur per unit distance or per unit area of the road. The density of road anomalies may be a high density, a medium density, a low density, etc. In an aspect, the high density refers to a large number of road anomalies per unit area of the road, indicating bad road conditions. The medium density refers to a moderate number of road anomalies per unit area of the road, indicating some visible road deterioration, but the road remains functional and safe for use. The low density refers to a few or no road anomalies per unit area of the road, indicating good road conditions.

To determine the density (i.e., high density, medium density, low density) of the road anomalies, the processing circuitry 214 compares the density of the road with a predetermined threshold. Upon determining that the density of the anomalies is above the predetermined threshold, such that there is a high density of anomalies in the area of the road, indicating bad road health. For example, the predetermined threshold for the high density of the road may=>10 road anomalies, for medium density=4-10 road anomalies, and for low density=0-3 road anomalies. Upon detecting more than 10 road anomalies on the road, the density of the road is determined to be high density.

Once the roadside computing device 110, 210 prepares documents (e.g., file) comprising the road anomaly 108 data. The roadside computing device 110, 210 transmits a notification to other multiple end computing devices installed over the other vehicle that are currently available on the road 106 in the proximity of the roadside computing device 110. The notification may include the road anomaly 108 data. In an embodiment, the notification is an anomaly 108-specific notification. For example, when a pothole-type anomaly 108 is detected, the notification may show a message as "Pothole Anomaly" or "Alligator crack Anomaly". In an embodiment, the notification, or the road anomaly 108 data, includes a warning notification such as, "Alert! An anomaly is detected. The anomaly is a crack.". In another example, the warning notification may include "Alert! An anomaly is detected. The anomaly is a long Longitudinal crack.".

Furthermore, the notification or the road anomaly 108 data additionally includes an image of the road anomaly 108, a location of the road anomaly 108, or a severity of the road anomaly 108, for example, "first type pothole" or "second type pothole". In an embodiment, the warning notification could be a sound, light, or vibration-based notification. For example, a stereo or a music player, a flashlight or a vibration-based steering wheel, connected with the end computing device 102, 202 may play the warning notification, flash a series of light, vibrate the steering wheel, simultaneously, to attract the attention of occupants of the other vehicle after it is detected by the ML module.

In an embodiment, the warning notification could be provided on the number of the cellphone user of a vehicle owner travelling by the other vehicle on the road 106. For example, the roadside computing device 110, 210 may fetch the cellphone number of other vehicles travelling on the road using the vehicle's numbers from number plates, as the vehicle owner's cell phone number is linked with the vehicle's number.

In another example, the roadside computing device 110, 210 may fetch, social media account, current WhatsApp status, WhatsApp location, Facebook account, twitter account, Instagram account, or alike, associated with the number of the cellphone to identify if the other vehicle is traveling on the road 106. If the roadside computing device 110, 210 identifies that the number of cellphone users appears to be traveling on the road 106 with the other vehicle having anomalies 108 on the road 106, the roadside computing device 110, 210 concludes that the user of the cellphone is traveling on the road 106 and thus transmits the warning notification to the number associated with the cellphone. In another embodiment, the warning notification could be provided based upon the GPS location of the other vehicle. For example, the roadside computing device 110, 210 may also be configured to fetch the GPS location of all vehicles currently travelling or planning to travel on the road 106. Based upon the GPS location of the other vehicle, the roadside computing device 110, 210 may provide the warning notification (e.g., when the vehicle is in the proximity of the identified anomaly). The transmission of the notification could be done via V2X communication technique, IoT or Wi-Fi using client server-based approach. In an embodiment, the stored road anomaly 108 data is also transmitted to a road maintenance authority via the server (e.g., cloud server).

Figure 3:
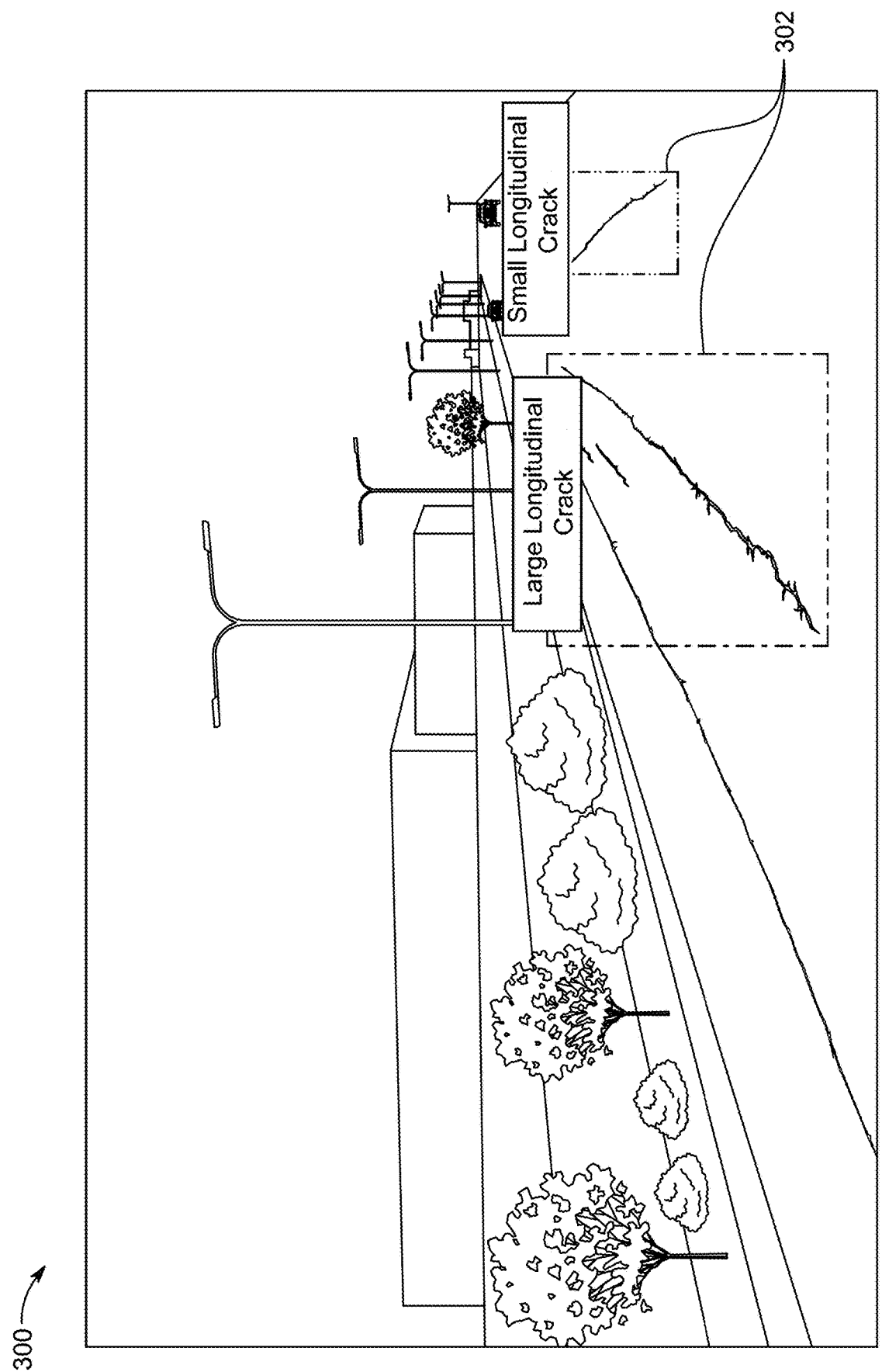
FIG. 3 illustrates an exemplary image displaying a large anomaly, according to certain embodiments.

FIG. 3 illustrates an exemplary image 300 displaying a large anomaly, according to certain embodiments. The image 300 is displayed in a graphic user interface. It is clearly visible in the displayed image that the ML module is efficiently able to identify the anomaly 108 even if the anomaly 108 is a pothole, longitudinal cracks, transverse cracks, or alligator cracks on the road 106 and even if the ML module is implemented at either the end computing device 102, 202 or the roadside computing device 110, 210. The image 300 contains the large anomaly on the road 106. The bounding box 302 is displayed as either red or green depending upon the severity of the anomaly 108. As shown in FIG. 3, the large anomaly gets detected multiple times in each frame. Further, overlapping detection bounding boxes include partially overlapping bounding boxes, and one bounding box completely engulfs another box.

Figure 4:
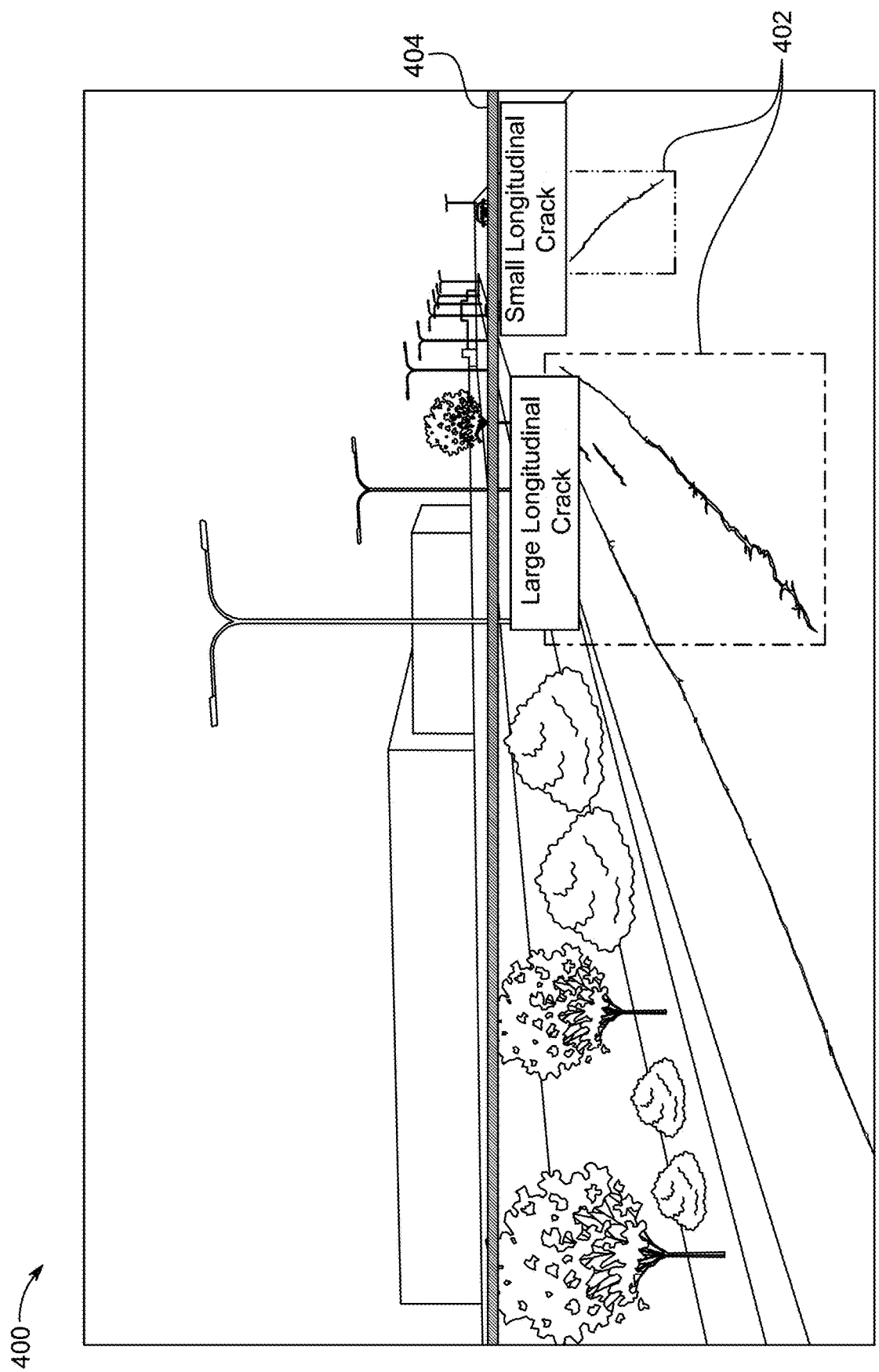
FIG. 4 illustrates an exemplary image representing model fidelity distance (MFD), according to certain embodiments.

FIG. 4 illustrates an exemplary image 400 representing model fidelity distance (MFD), according to certain embodiments.

To overcome problems of large anomalies detected multiple times in sequential frames (as shown in FIG. 3) and overlapping detection bounding boxes, the skipping frame technique is applied. The skipping frame is also referred to as a key frame. The key frame is a frame whose next frame represents the beginning of a new scene. The key frame is dependent on the speed of the vehicle and the Model Fidelity Distance (MFD). The MFD is the distance within which the machine learning (ML) model maintains high accuracy and reliable performance. The MFD is a distance that the ML model can detect objects within a predetermined error. In an embodiment of the ML model, the MFD 404 is found to be around 10 meters by testing the system. Below the MFD 404, the two bounding boxes 402 are shown in FIG. 4.

FIGS. 5A, 5B, 5C, 5D illustrate exemplary images (500a, 500b, 500c, 500d) displaying cases of overlapping bounding boxes, according to certain embodiments.

Figure 5A:
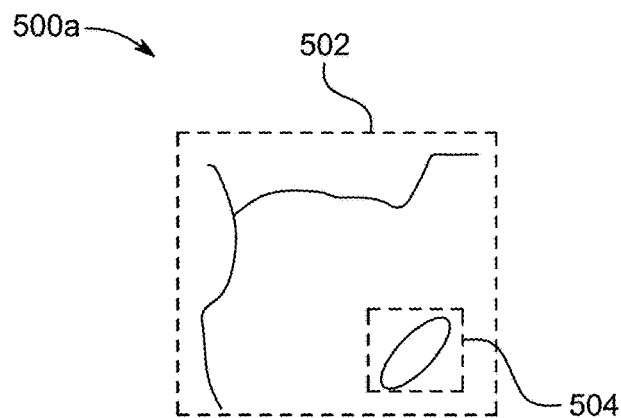
FIG. 5A illustrates an exemplary image displaying fully overlapping bounding boxes of different classes, according to certain embodiments.
Figure 5B:
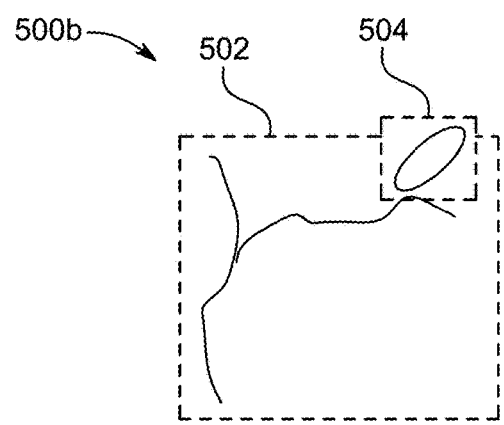
FIG. 5B illustrates an exemplary image displaying partially overlapping bounding boxes of different classes, according to certain embodiments.
Figure 5C:
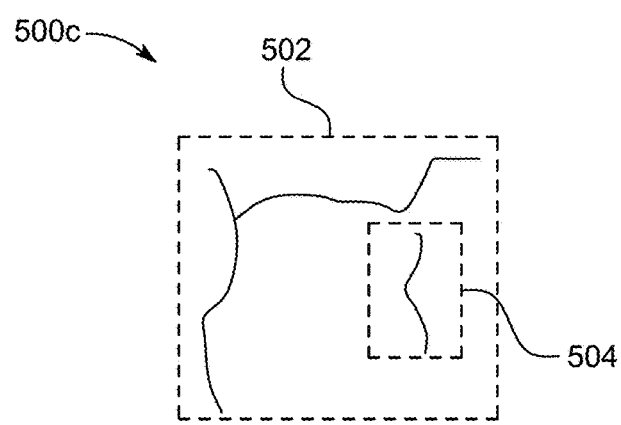
FIG. 5C illustrates an exemplary image displaying fully overlapping bounding boxes of same class, according to certain embodiments.
Figure 5D:
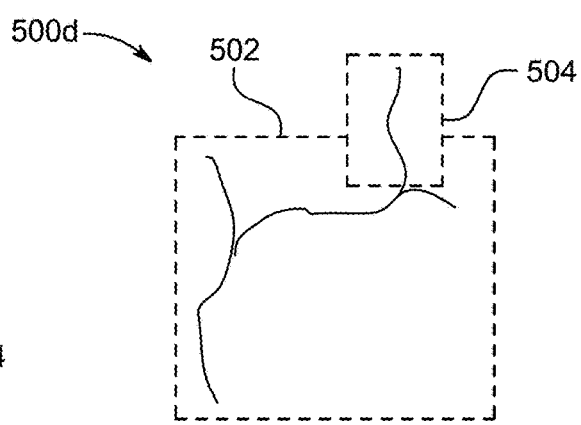
FIG. 5D illustrates an exemplary image displaying partially overlapping bounding boxes of the same class, according to certain embodiments.

As illustrated in FIGS. 5A, 5B, 5C, 5D, the intersections and unions of the predicted bounding boxes occur in each tested frame. Possible cases of overlapping bounding boxes are shown in FIGS. 5A, 5B, 5C, 5D. The partially overlapping bounding boxes are illustrated in FIGS. 5B and 5D.

For partially overlapping bounding boxes, the intersection over union (IoU) is checked against a predefined threshold. If the IoU exceeds the predefined threshold, the two anomalies are counted as one large, connected/growing anomaly. This indicates a high density of anomalies in the road's area, which is a bad sign for the road's health.

FIG. 5A illustrates an exemplary image 500a displaying fully overlapping bounding boxes of different classes, according to certain embodiments.

As illustrated in FIG. 5A, case 1—Fully overlapping of different classes (i.e., object box 504 fully overlapped by object 502). The object box 502 covers the crack, and the object box 504 covers the pothole. One bounding box completely engulfs another box. The area of the small bounding box is compared with the intersection between the two detected bounding boxes. If two detected bounding boxes are equal and have different classes, then count them as two different anomalies.

FIG. 5B illustrates an exemplary image 500b displaying partially overlapping bounding boxes of different classes, according to certain embodiments.

As illustrated in FIG. 5B, case 2—Partially overlapping of different classes (i.e., object boxes 502, 504 partially overlap). The object box 502 covers the crack, and the object box 504 covers the pothole.

FIG. 5C illustrates an exemplary image 500c displaying fully overlapping bounding boxes of same class, according to certain embodiments.

As illustrated in FIG. 5C, case 3—Fully overlapping of same class (i.e., object box 504 fully overlapped by object 502). The object box 502 covers the large crack, and the object box 504 covers the small crack. If two detected bounding boxes are equal and have the same class, then count them as one anomaly, as illustrated in FIG. 5C.

FIG. 5D illustrates an exemplary image 500d displaying partially overlapping bounding boxes of the same class, according to certain embodiments.

As illustrated in FIG. 5D, case 4—Partially overlapping of same class (i.e., object boxes 502, 504 partially overlap). The object box 502 covers the large crack, and the object box 504 covers the small crack.

Figure 6:
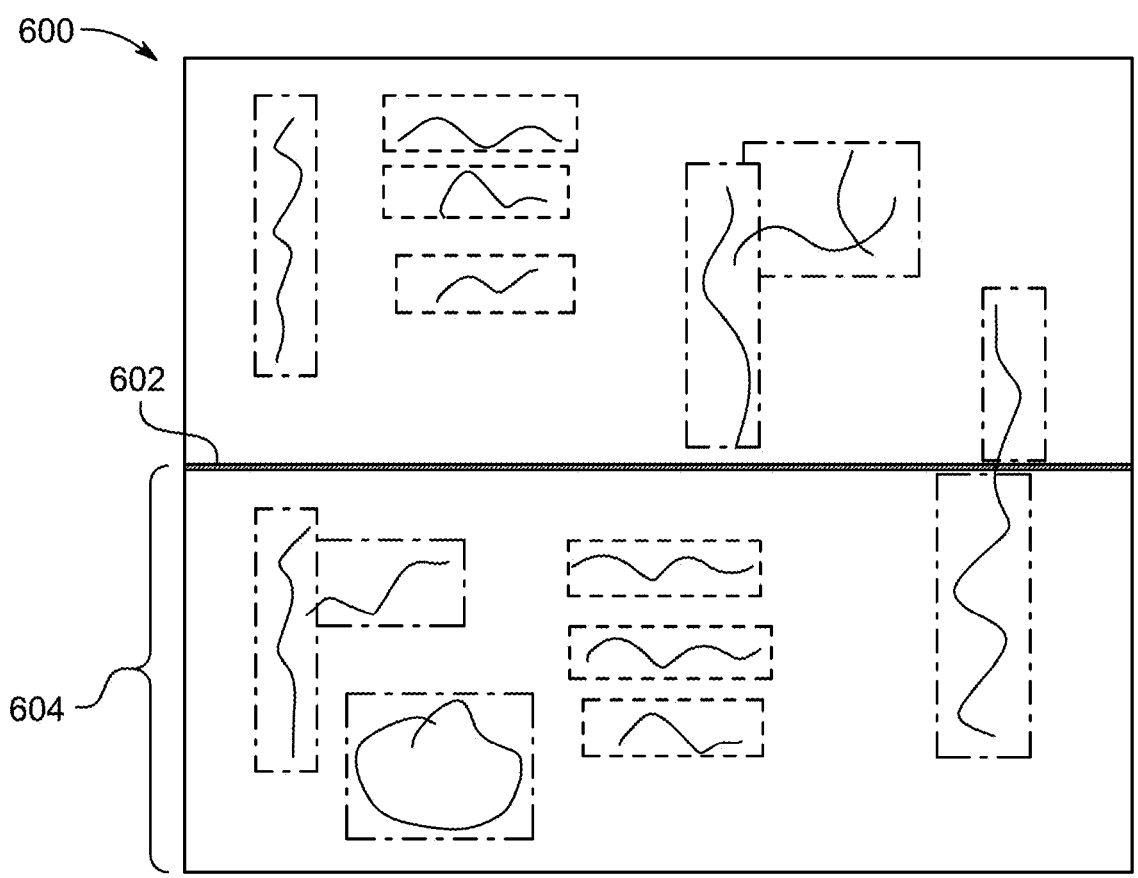
FIG. 6 illustrates an exemplary video frame displaying possible scenarios, according to certain embodiments.

FIG. 6 illustrates an exemplary video frame 600 displaying possible scenarios, according to certain embodiments. The video frame 600 displays a Model Fidelity Distance (MFD) line 602 and MFD 604. For example, the MFD line 602=10 meters, as estimated in FIG. 4, where the ML model performs well.

Figure 7:
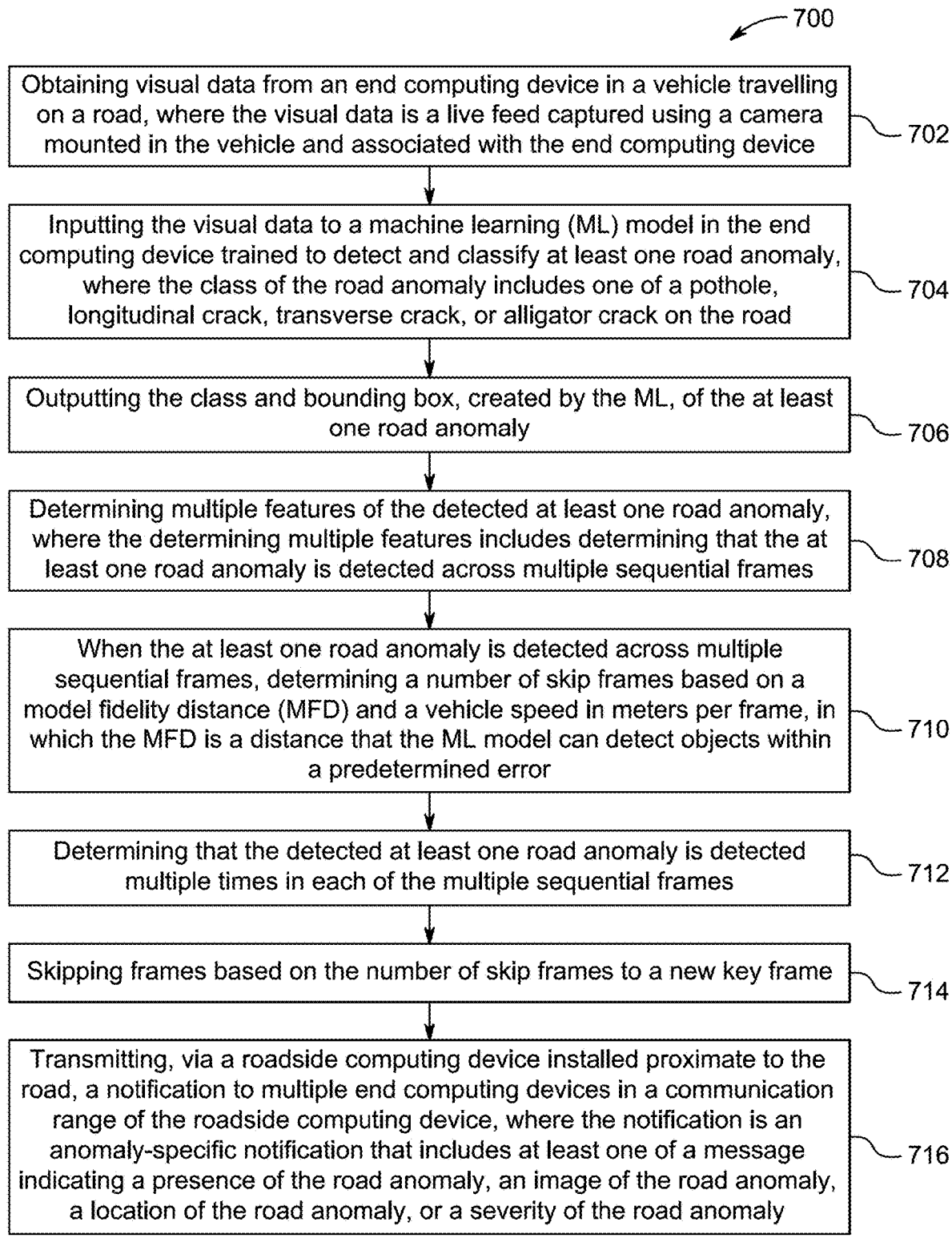
FIG. 7 illustrates a flowchart of a method of detecting road anomalies, according to certain embodiments.

FIG. 7 illustrates a flowchart of a method 700 of detecting road anomalies 108, according to an embodiment. The method 700 is described in conjunction with FIG. 1-FIG. 6. Various steps of the method 700 are included through blocks in FIG. 7. One or more blocks may be combined or eliminated to achieve the objective of the method of detecting road anomalies 108 without departing from the scope of the present disclosure.

At step 702, the method 700 includes obtaining visual data from an end computing device 102, 202 in a vehicle 104 travelling on a road 106. The visual data is a live feed captured using a camera 114 mounted in the vehicle 104 and associated with the end computing device 102.

At step 704, the method 700 includes inputting the visual data to a machine learning (ML) model in the end computing device 102 trained to detect and classify at least one road anomaly 108. The class of the road anomaly 108 includes one of a pothole, longitudinal crack, transverse crack, or alligator crack on the road 106.

At step 706, the method 700 includes outputting the class and bounding box 402, created by the ML, of the at least one road anomaly 108.

At step 708, the method 700 includes determining multiple post-detection features of the detected at least one road anomaly 108. The determining multiple post-detection features includes determining that the at least one road anomaly 108 is detected across multiple sequential frames. The multiple post-detection features include an object box area, intersection of neighboring object boxes 502, 504 and union of neighboring object boxes 502, 504. The method 700 further includes determining whether neighboring object boxes 502, 504 are one of fully overlapping for objects of different classes, partially overlapping for objects of different classes, fully overlapping for objects of same class, and partially overlapping for objects of same class.

The method 700 includes when it is determined that neighboring object boxes 502, 504 are fully overlapping for objects of different classes, count them as two different anomalies. When it is determined that neighboring object boxes 502, 504 are fully overlapping for objects of same class, then count them as one anomaly. Further, when it is determined that the neighboring object boxes 502, 504 are partially overlapping, determining a ratio of the Intersection and the Union (IoU) and checking the IoU against a predefined threshold. If the IoU exceeds a predefined threshold, the neighboring anomalies are counted as one large, connected anomaly, and removing a smaller of the neighboring object boxes 502, 504 from a count of road anomalies.

At step 710, the method 700 includes when the at least one road anomaly 108 is detected across multiple sequential frames, determining a number of skip frames based on a model fidelity distance (MFD) and a vehicle speed in meters per frame, in which the MFD 404, 604 is a distance that the ML model can detect objects within a predetermined error.

At step 712, the method 700 includes determining that the detected at least one road anomaly 108 is detected multiple times in each of the multiple sequential frames.

At step 714, the method 700 includes skipping frames based on the number of skip frames to a new key frame.

At step 716, the method 700 includes transmitting, via a roadside computing device 110, 210 installed proximate to the road 106, a notification to multiple end computing devices in a communication range of the roadside computing device 110, 210. The notification is an anomaly-specific notification that includes at least one of a message indicating a presence of the road anomaly, an image of the road anomaly, a location of the road anomaly, or a severity of the road anomaly.

The method 700 further comprises assessing a severity of the road 106. The severity is determined to be of a first value when an area of the bounding box 402 exceeds a severity threshold area.

The method 700 includes determining a density of the road anomalies. The method 700 further includes determining that the density of the anomalies is above a predetermined threshold, such that there is a high density of anomalies in the area of the road 106, indicating bad road health.

The method 700 includes maintaining a count of a number of road anomalies.

The method 700 includes the ML model that is implemented at the end computing device 102, 202. The end computing device is configured to stream portions of the visual data containing the detected road anomaly to the roadside computing device 110, 210.

Based upon FIGS. 1, 2, 4, 6, and 7, the invention further includes a non-transitory computer-readable storage medium for storing computer-readable instructions that, when executed by a computer, cause the computer to perform a method of detecting road anomaly 108. The method may be implemented as the non-transitory computer-readable storage medium and stored in the memory 216 of the end computing device 102, 202. In an embodiment, the method may also be implemented as the non-transitory computer-readable storage medium and stored in the memory 206 of the roadside computing device 110, 210.

The method includes obtaining visual data from an end computing device 102, 202 in a vehicle 104 travelling on a road 106. The visual data is a live feed captured using a camera mounted in the vehicle and associated with the end computing device 102, 202. The method further includes inputting the visual data to a machine learning (ML) model in the end computing device 102, 202 can learn to detect and classify at least one road anomaly 108. The class of the road anomaly includes one of a pothole, longitudinal crack, transverse crack, or alligator crack on the road 106. The method further includes outputting the class and a bounding box 502, 504, created by the ML, of the at least one road anomaly 108. The method further includes determining multiple post-detection features of the detected at least one road anomaly 108. The determining multiple post-detection features includes determining that the at least one road anomaly 108 is detected across multiple sequential frames. The method further includes when the at least one road anomaly 108 is detected across multiple sequential frames, determining a number of skip frames based on a model fidelity distance (MFD) 404 and a vehicle speed in meters per frame, in which the MFD 404 is a distance that the ML model can detect objects within a predetermined error. The method further includes determining that the detected at least one road anomaly 108 is detected multiple times in each of the multiple sequential frames. The method further includes skipping frames based on the number of skip frames to a new key frame. The method further includes transmitting, via a roadside computing device 110, 210 installed proximate to the road 106, a notification to multiple end computing devices 102, 202 in a communication range of the roadside computing device 110, 210. The notification is an anomaly-specific notification that includes at least one of a message indicating a presence of the road anomaly, an image of the road anomaly, a location of the road anomaly, or a severity of the road anomaly.

The non-transitory computer-readable storage medium for storing computer-readable instructions for executing the method for detecting the anomaly 108, the method further includes assessing a severity of the road. The severity is determined to be of a first value when an area of the bounding box exceeds a severity threshold area.

The non-transitory computer-readable storage medium for storing computer-readable instructions for executing the method for detecting the anomaly 108, the method further includes determining multiple post-detection features of the detected at least one road anomaly 108. The multiple post-detection features include an object box area, intersection of neighboring object boxes 502, 504, union of neighboring object boxes 502, 504. The method further includes determining whether neighboring object boxes 502, 504 are one of fully overlapping for objects of different classes, partially overlapping for objects of different classes, fully overlapping for objects of same class, and partially overlapping for objects of same class.

The non-transitory computer-readable storage medium for storing computer-readable instructions for executing the method for detecting the anomaly 108, the method further includes when it is determined that neighboring object boxes 502, 504 are fully overlapping for objects of different classes, count them as two different anomalies.

The non-transitory computer-readable storage medium for storing computer-readable instructions for executing the method for detecting the anomaly 108, the method further includes when it is determined that neighboring object boxes are fully overlapping for objects of same class, then count them as one anomaly.

The non-transitory computer-readable storage medium for storing computer-readable instructions for executing the method for detecting the anomaly 108, the method further includes when it is determined that the neighboring object boxes are partially overlapping, determining a ratio of the Intersection and the Union (IoU) and checking the IoU against a predefined threshold. The method further includes if the IoU exceeds a predefined threshold, the neighboring anomalies are counted as one large, connected anomaly and removing a smaller of the neighboring object boxes from a count of road anomalies.

The non-transitory computer-readable storage medium for storing computer-readable instructions for executing the method for detecting the anomaly 108, the method further includes determining a density of the road anomalies.

The non-transitory computer-readable storage medium for storing computer-readable instructions for executing the method for detecting the anomaly 108, the method further includes determining that the density of the anomalies is above a predetermined threshold, such that there is a high density of anomalies in the area of the road, indicating bad road health.

The non-transitory computer-readable storage medium for storing computer-readable instructions for executing the method for detecting the anomaly 108, the method further includes maintaining a count of a number of road anomalies.

The non-transitory computer-readable storage medium for storing computer-readable instructions for executing the method for detecting the anomaly 108, where the ML model is implemented at the end computing device 102, 202, wherein the end computing device 102, 202 is configured to stream portions of the visual data containing the detected road anomaly to the roadside computing device 110, 210.

Figure 8:
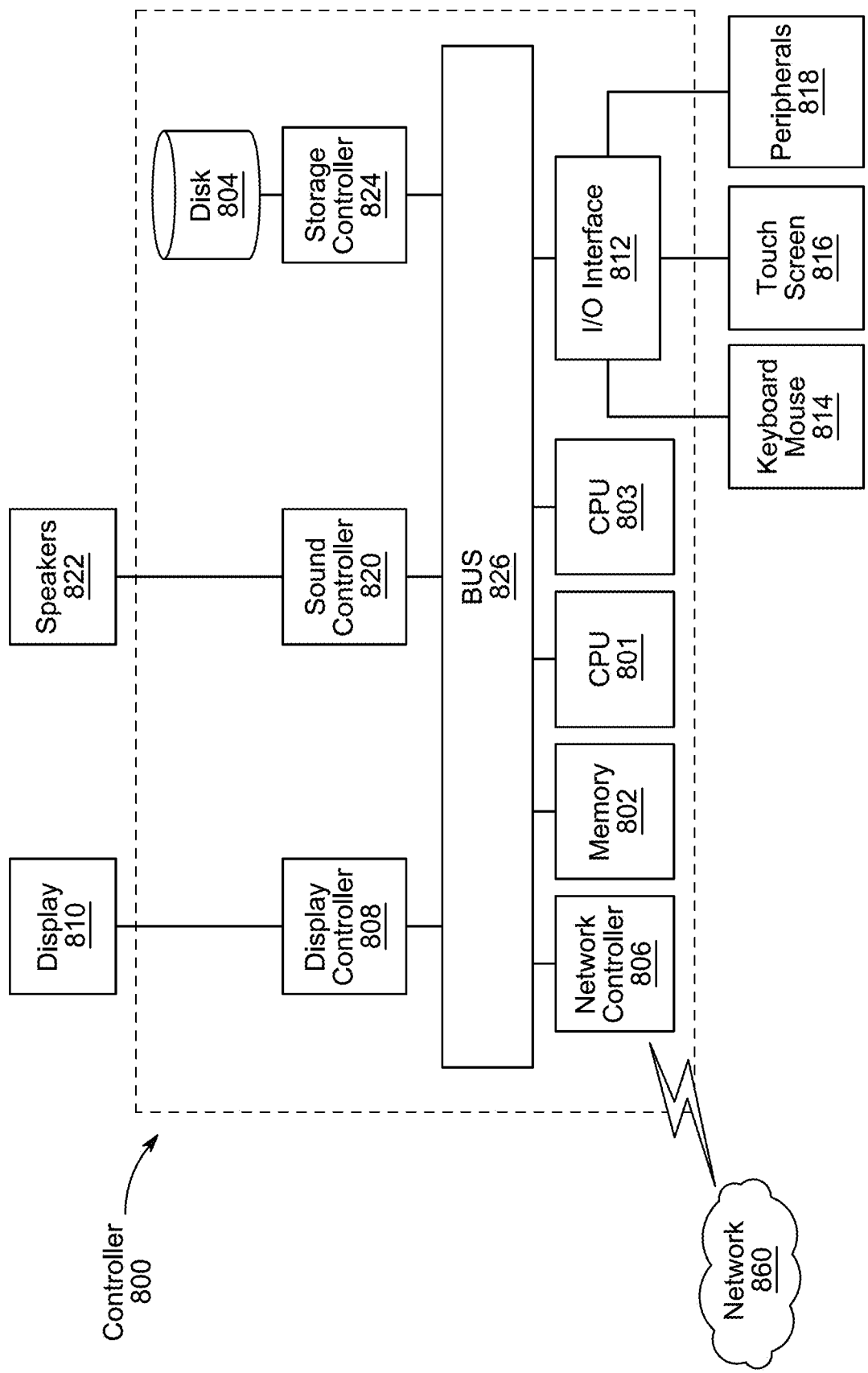
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 800 described is representative of the end computing device 102, 202, configured for detecting road anomalies as illustrated in FIG. 1 and FIG. 2. In another embodiment, the controller 800 described is representative of the roadside computing device 110, 210 configured for detecting road anomalies as illustrated in FIG. 1. In either case, the controller 800 is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 801, 803 and an operating system such as Microsoft Windows 7, Microsoft Windows 10, Microsoft Windows 11, UNIX, Solaris, LINUX, Apple MAC-OS, and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
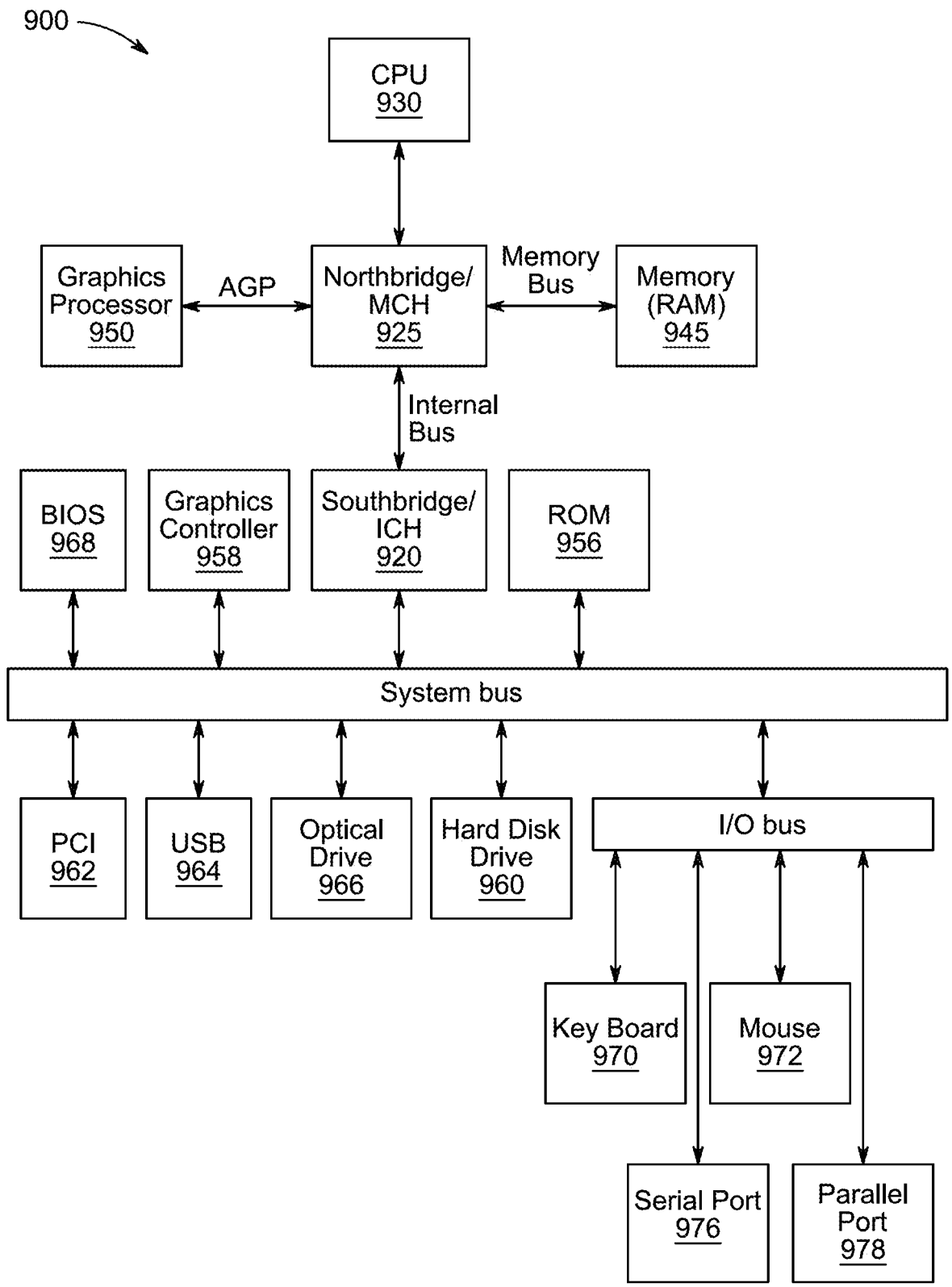
FIG. 9 is an exemplary schematic diagram of a data processing system used within the computing system, according to certain embodiments.

FIG. 9 shows a schematic diagram of a data processing system 900, according to certain embodiments, for performing the functions of the exemplary embodiments. The data processing system 900 is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
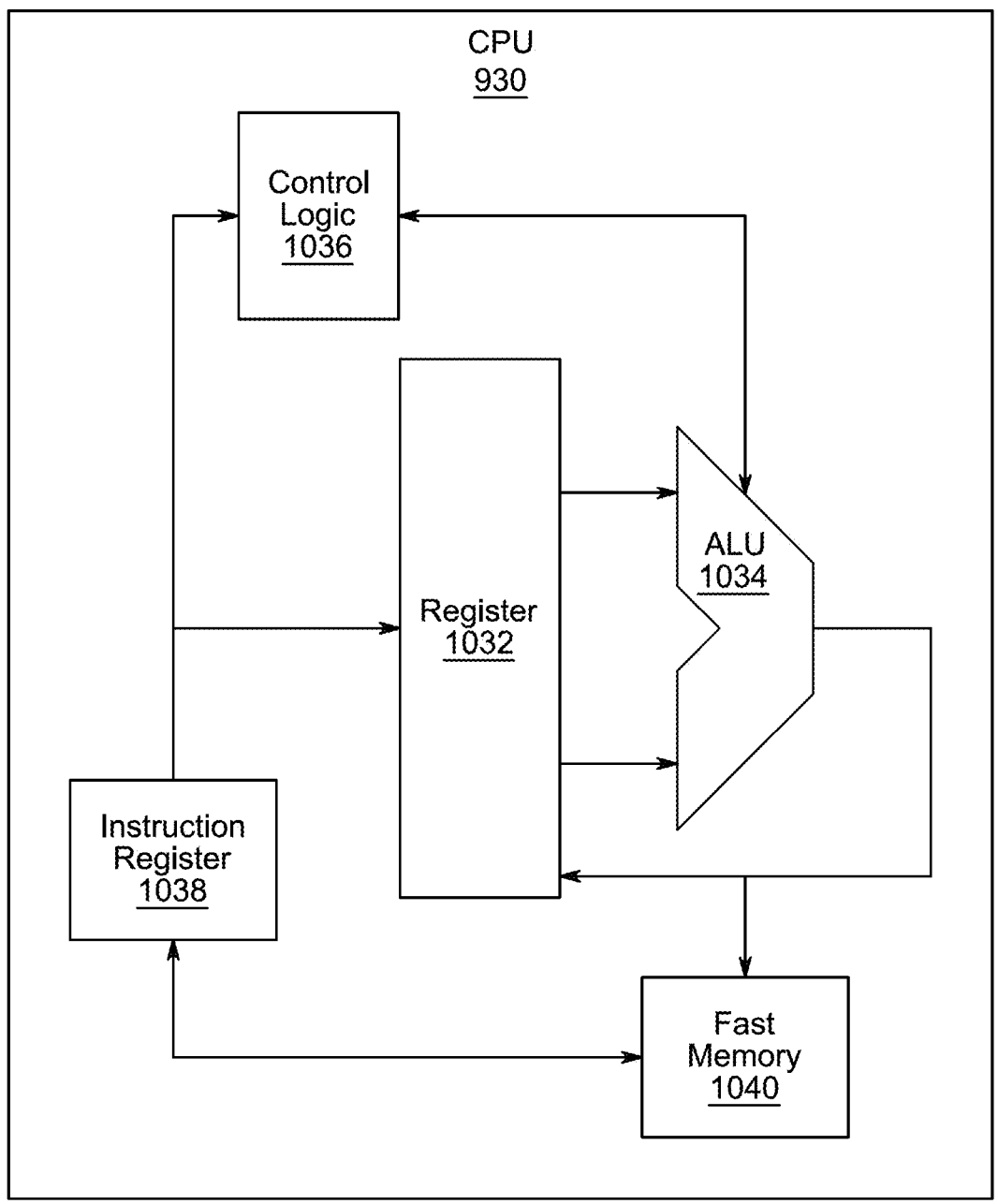
FIG. 10 is an exemplary schematic diagram of a processor used with the computing system, according to certain embodiments.

For example, FIG. 10 shows one implementation of CPU 930, according to an embodiment. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 920 through a PCI bus 962. The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
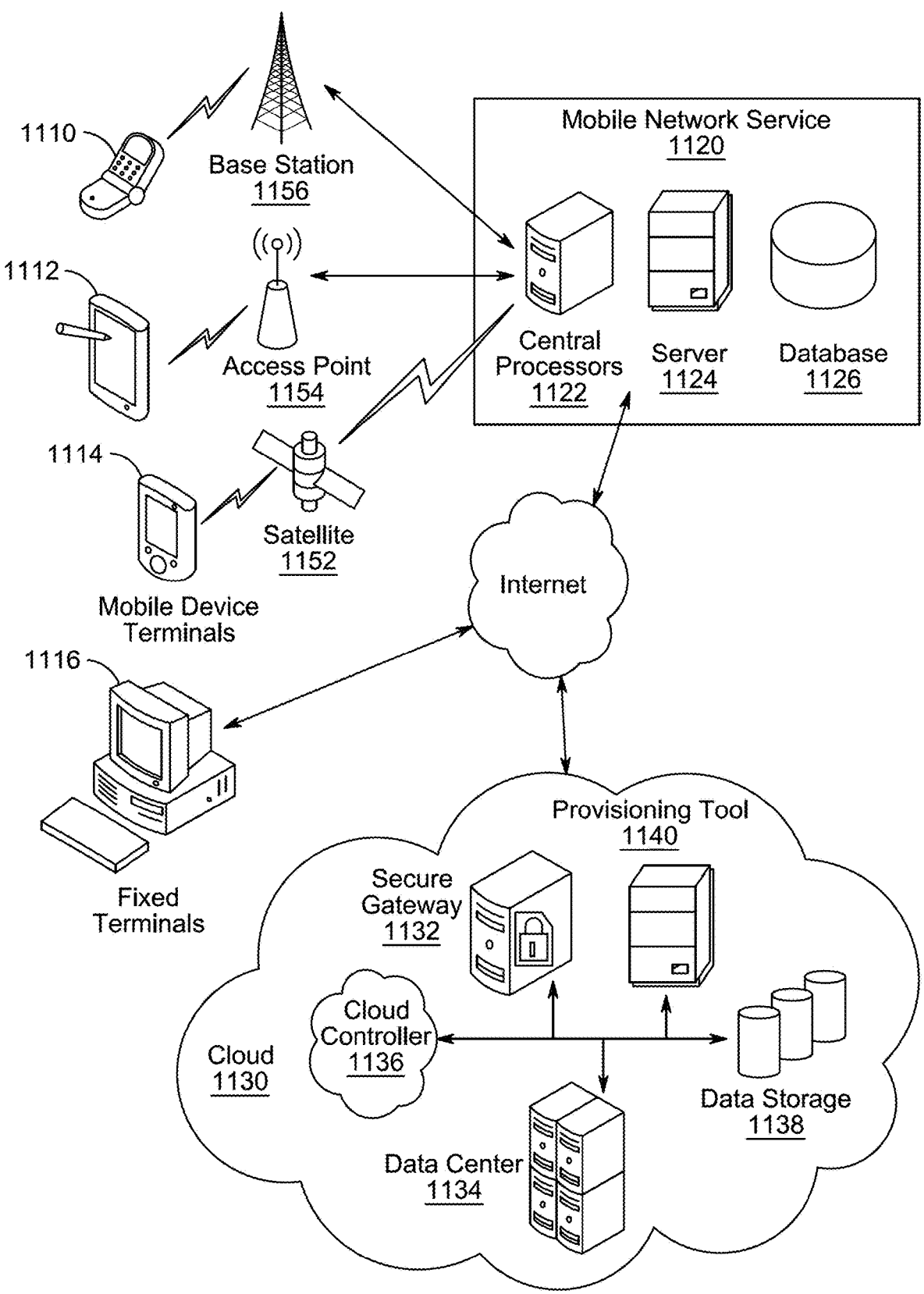
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown in FIG. 11, in addition to various human interface and communication devices (e.g., display monitors, smart phones, tablets, personal digital assistants (PDAs)). More specifically, FIG. 11 illustrates client devices including a smartphone 1111, a tablet 1112, a mobile device terminal 1114 and fixed terminals 1116. These client devices may be communicatively coupled with a mobile network service 1120 via a base station 1156, an access point 1154, a satellite 1152 or via an internet connection. The mobile network service 1120 may comprise central processors 1122, a server 1124 and a database 1126. The fixed terminals 1116 and the mobile network service 1120 may be commutatively coupled via an internet connection to functions in the cloud 1130 that may comprise a security gateway 1132, a data center 1134, a cloud controller 1136, a data storage 1138 and a provisioning tool 1140. The network may be a private network, such as the LAN or the WAN, or may be a public network, such as the Internet. Input to the system may be received via direct user input or received remotely, either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. A method of detecting road anomalies, the method comprising:
 obtaining visual data of a road from an end computing device in a vehicle travelling along the road, wherein the visual data is a live feed captured using a camera mounted in or on the vehicle and sent to the end computing device;
 inputting the visual data to a machine learning (ML) model in the end computing device that learns to detect and classify at least one road anomaly into a class including one of a pothole, a longitudinal crack, a transverse crack, or an alligator crack on the road;
outputting the class and a bounding box, created by the ML model, of the at least one road anomaly;
determining multiple post-detection features of the detected at least one road anomaly, wherein the determining multiple post-detection features includes determining that the at least one road anomaly is detected across multiple sequential frames;
when the at least one road anomaly is detected across multiple sequential frames, determining a number of skip frames based on a model fidelity distance (MFD) and a vehicle speed, wherein the MFD is a distance that the ML model can detect objects within a predetermined error;
determining that the detected at least one road anomaly is detected multiple times in each of the multiple sequential frames;
skipping frames based on the number of skip frames to a key frame; and
transmitting, via a roadside computing device installed proximate to the road, a notification to multiple end computing devices in a communication range of the roadside computing device, wherein the notification is an anomaly-specific notification that includes at least one of a message indicating a presence of the road anomaly, an image of the road anomaly, a location of the road anomaly, or a severity of the road anomaly.

2. The method of claim 1, further comprising: assessing a severity of the road, wherein the severity is determined to be of a first value when an area of the bounding box exceeds a severity threshold area.

3. The method of claim 1, further comprising:
determining multiple post-detection features of the detected at least one road anomaly, wherein the multiple post-detection features include an object box area, intersection of neighboring object boxes, union of neighboring object boxes; and
determining whether neighboring object boxes are one of
fully overlapping for objects of different classes,
partially overlapping for objects of different classes,
fully overlapping for objects of same class,
partially overlapping for objects of same class.

4. The method of claim 3, further comprising
when it is determined that neighboring object boxes are fully overlapping for objects of different classes, count them as two different anomalies.

5. The method of claim 3, further comprising
when it is determined that neighboring object boxes are fully overlapping for objects of same class, then count them as one anomaly.

6. The method of claim 3, further comprising:
when it is determined that the neighboring object boxes are partially overlapping,
determining a ratio of the Intersection and the Union (IoU),
checking the IoU against a predefined threshold,
if the IoU exceeds the predefined threshold, the neighboring anomalies are counted as one large, connected anomaly, and
removing a smaller of the neighboring object boxes from a count of road anomalies.

7. The method of claim 6, further comprising determining a density of the road anomalies.

8. The method of claim 7, further comprising determining that the density of the anomalies is above a predetermined threshold, such that there is a high density of anomalies in the area of the road, indicating bad road health.

9. The method of claim 1, further comprising maintaining a count of a number of road anomalies.

10. The method of claim 1, wherein the ML model is implemented at the end computing device, wherein the end computing device is configured to stream portions of the visual data containing the detected road anomaly to the roadside computing device.

11. A system comprising:
at least one camera, mounted in a vehicle, configured to capture a live feed;
an end computing device, in or on the vehicle travelling along a road, configured to send visual data of a road, wherein the visual data is the live feed captured using the camera;
a processing circuitry configured to:
input the visual data to a machine learning (ML) model that learns to detect and classify at least one road anomaly into a class including one of a pothole, longitudinal crack, transverse crack, or alligator crack on the road;
output the class and a bounding box, created by the ML model, of the at least one road anomaly;
determine multiple post-detection features of the detected at least one road anomaly, wherein the determined multiple post-detection features includes that the at least one road anomaly is detected across multiple sequential frames,
when the at least one road anomaly is detected across multiple sequential frames, determine a number of skip frames based on a model fidelity distance (MFD) and a vehicle speed, wherein the MFD is a distance that the ML model can detect objects within a predetermined error;
determine that the detected at least one road anomaly is detected multiple times in each of the multiple sequential frames;
skip frames based on the number of skip frames to a key frame; and
a roadside computing device installed proximate to the road, configured to transmit a notification to multiple end computing devices in a communication range of the roadside computing device, wherein the notification is an anomaly-specific notification that includes at least one of a message indicating a presence of the road anomaly, an image of the road anomaly, a location of the road anomaly, or a severity of the road anomaly.

12. The system of claim 11, wherein the processing circuitry is further configured to assess a severity of the road, wherein the severity is determined to be of a first value when an area of the bounding box exceeds a severity threshold area.

13. The system of claim 11, wherein the processing circuitry is further configured to determine multiple post-detection features of the detected at least one road anomaly, wherein the multiple post-detection features include an object box area, intersection of neighboring object boxes, union of neighboring object boxes;
determine whether neighboring object boxes are one of
fully overlapping for objects of different classes,
partially overlapping for objects of different classes,
fully overlapping for objects of same class,
partially overlapping for objects of same class.

14. The system of claim 13, wherein the processing circuitry is further configured to when it is determined that neighboring object boxes are fully overlapping for objects of different classes, count them as two different anomalies.

15. The system of claim 13, wherein the processing circuitry is further configured to when it is determined that neighboring object boxes are fully overlapping for objects of same class, then count them as one anomaly.

16. The system of claim 13, wherein the processing circuitry is further configured to when it is determined that the neighboring object boxes are partially overlapping, determine a ratio of the Intersection and the Union (IoU), check the IoU against a predefined threshold, if the IoU exceeds a predefined threshold, the neighboring object boxes are counted as one large, connected anomaly, and remove a smaller of the neighboring object boxes from a count of road anomalies.

17. The system of claim 16, wherein the processing circuitry is further configured to determine a density of the road anomalies.

18. The system of claim 17, wherein the processing circuitry is further configured to determine that the density of the anomalies is above a predetermined threshold, such that there is a high density of anomalies in the area of the road, indicating bad road health.

19. The system of claim 11, wherein the processing circuitry is further configured to accumulate a count of a number of road anomalies.

20. The system of claim 11, wherein the ML model is implemented at the end computing device, wherein the end computing device is configured to stream portions of the visual data containing the detected road anomaly to the roadside computing device.

* * * * *